US008908999B2

(12) United States Patent
Ishihara et al.

(10) Patent No.: US 8,908,999 B2
(45) Date of Patent: Dec. 9, 2014

(54) INFORMATION PROCESSOR, METHOD, AND PROGRAM FOR DOCUMENT PROOFREADING

(71) Applicant: International Business Machines Corporation, Armonk, NY (US)

(72) Inventors: Tatsuya Ishihara, Tokyo (JP); Hironobu Takagi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 13/784,897

(22) Filed: Mar. 5, 2013

(65) Prior Publication Data

US 2013/0243263 A1  Sep. 19, 2013

(30) Foreign Application Priority Data

Mar. 6, 2012 (JP) .................. 2012-049519

(51) Int. Cl.
- *G06K 7/10* (2006.01)
- *G06K 9/00* (2006.01)
- *G06K 9/03* (2006.01)

(52) U.S. Cl.
CPC .......... *G06K 9/00442* (2013.01); *G06K 9/033* (2013.01)
USPC .......................................... 382/321; 382/181

(58) Field of Classification Search
None
See application file for complete search history.

(56) References Cited

U.S. PATENT DOCUMENTS

| 8,074,184 | B2 * | 12/2011 | Garside et al. | 715/854 |
| 8,290,270 | B2 * | 10/2012 | Bayer et al. | 382/179 |
| 8,565,526 | B2 * | 10/2013 | Bayer et al. | 382/179 |
| 2005/0099398 | A1 * | 5/2005 | Garside et al. | 345/173 |

FOREIGN PATENT DOCUMENTS

JP  2009-181225 A  8/2009

OTHER PUBLICATIONS

Mayur Datar et al., "Locality-Sensitive Hashing Scheme based on P-Stable Distributions", Proceeding the 20th Ann. Symp. on Comp. Geo., SCG 2004, p. 253-262. ACM, NY, NY, USA.
Liangcai Gao et al., "Structure Extraction from PDF-based Book Documents," JDCL'11, Jun. 13-17, 2011, pp. 1-20 Ottawa, Ontario, Canada.

* cited by examiner

*Primary Examiner* — Anand Bhatnagar
*Assistant Examiner* — Soo Park
(74) *Attorney, Agent, or Firm* — Vazken Alexanian

(57) ABSTRACT

A method, apparatus and program for proofreading a document. The information processor includes a first storage unit for storing output information which includes information text and positional information obtained by performing Optical Character Recognition (OCR) on a source manuscript image. A second storage unit for storing a document file that is proofread by a user, wherein the document file is generated by reading the OCR-processed text according to the order of reading the output information A line movement detection unit for detected movement of a line which includes text in the document file based on the proofreading performed by the user on the document file. A merge unit for reflecting result of the proofreading of the document file in the output information.

9 Claims, 19 Drawing Sheets

```
<Page ID="P1_PHYSICAL_IMG_NR=1" HEIGHT="1026" WIDTH="718" POSITION="Right" ACCURACY="0">
  <TopMargin ID="P1_TM0001" HPOS="0" VPOS="0" WIDTH="718" HEIGHT="57"/>
  <LeftMargin ID="P1_LM0001" HPOS="0" VPOS="57" WIDTH="68" HEIGHT="870"/>
  <RightMargin ID="P1_RM0001" HPOS="618" VPOS="57" WIDTH="100" HEIGHT="870"/>
  <BottomMargin ID="P1_BM0001" HPOS="0" VPOS="926" WIDTH="718" HEIGHT="100"/>
  <PrintSpace ID="P1_PS0001" HPOS="68" VPOS="57" WIDTH="551" HEIGHT="870">
    <TextBlock ID="P1_TB0001" HPOS="68" VPOS="57" WIDTH="74" HEIGHT="870" OPOLY="68,57,618,57,618,926,68,926">
      <TextLine ID="P1_TL0001" HPOS="68" VPOS="57" WIDTH="74" HEIGHT="9" OPOLY="68,57,141,57,141,65,68,65">
        <String CC="888" CONTENT="Home" DICT="0" HEIGHT="9" OPOLY="68,57,141,57,141,65,68,65" >
          OPOLY="1382,1103,1446,1103,1446,1221,1382,1221" ID="P52_SY00162" OPOLY="1383,1103,1446,1159,1383,1159"
          <SymbolHEIGHT="56" HPOS="1383" ID="P52_SY00162" WC="0.80" WIDTH="64">
          SUSP="1" VPOS="1103" WIDTH="63">
            <Variant VC="86" VS="Hom" />
            <Variant VC="82" VS="Sho" />
            <Variant VC="77" VS="Su" />
            <Variant VC="76" VS="Bo" />
            <Variant VC="74" VS="Moku" />
            <Variant VC="71" VS="Bo" />
            <Variant VC="70" VS="To" />
          <Symbol>
```

FIG. 2

INFORMATION PROCESSOR, METHOD, AND PROGRAM FOR DOCUMENT PROOFREADING

CROSS-REFERENCE TO RELATED APPLICATION

This application claims priority under 35 U.S.C. §119 from Japanese Patent Application No. 2012-049519 filed Mar. 6, 2012, the entire contents of which are incorporated herein by reference.

BACKGROUND OF THE INVENTION

1. Field of the Invention

The present invention is related to technology for proofreading a document. More particularly, the present invention is related to an information processor, method, and program for proofreading a digitized document generated by OCR (Optical Character Recognition) processing of a source manuscript image.

2. Description of the Related Art

There has recently been an increase in the need for digitization of old books for cultural preservation. Digitization projects are taking place, such as the digitization project of the Japanese National Diet Library, the IMPACT project of the EU.

Due to the great number of library books being handled by large scale digitization projects, there is a demand for efficient character proofreading of source manuscript images produced by OCR (Optical Character Recognition) processing of documents.

SUMMARY OF THE INVENTION

An aspect of the present invention is to provide an information processor for proofreading a document. The information processor includes a first storage unit for storing output information which includes information text and positional information obtained by performing Optical Character Recognition (OCR) on a source manuscript image. A second storage unit for storing a document file that is proofread by a user, wherein the document file is generated by reading the OCR-processed text according to the order of reading the output information. A line movement detection unit for detected movement of a line which includes text in the document file based on the proofreading performed by the user on the document file. A merge unit for reflecting result of the proofreading of the document file in the output information. The line movement detection unit calculates a weight indicating a degree of matching between the line deletion operation for deletion of the line which includes text in the document file and the line insertion operation or the line editing operation. The line movement detection unit detects movement of the line by determining whether a line deletion operation and a line insertion operation or a line editing operation results in a maximum weight. The merge unit displaces text that is a constituent element of the line and included in the output information, if the line movement detection unit has detected of the line according to the information a destination of the line obtained by calculating the weight.

Another aspect of the present invention provides a method for proofreading a document which includes generating a document file positioning text according to the order of reading of Optical Character Recognition (OCR) processed text, based on output information which includes text obtained by an OCR processing of a source manuscript image and information of position of the text in the source manuscript image. Further includes detecting movement of a line which includes text in the document file produced by proofreading by a user. The method further includes reflecting results of proofreading of the document file in the output information. The process of detecting movement includes calculating a weight indicating a degree of matching between a line deletion operation of deleting the line which includes text in the document file and a line insertion operation or a line editing operation. The method further includes determining the line as being moved if the line deletion operation and the line insertion operation or the line editing operation have the maximum weight. If movement of the line is detected, the reflection process includes moving text constituting the line in the output information according to information of designation of the line obtained by calculating the weight.

Another aspect of the present invention provides a computer readable non-transitory article of manufacturing tangibly embodying computer readable instruction which, when executed cause a computer to carry out the method steps described above.

BRIEF DESCRIPTION OF DRAWINGS

FIG. 2 shows an embodiment of output information generated by the information processor of the present information using OCR processing.

DETAILED DESCRIPTION OF PREFERRED EMBODIMENTS

Figure 1:
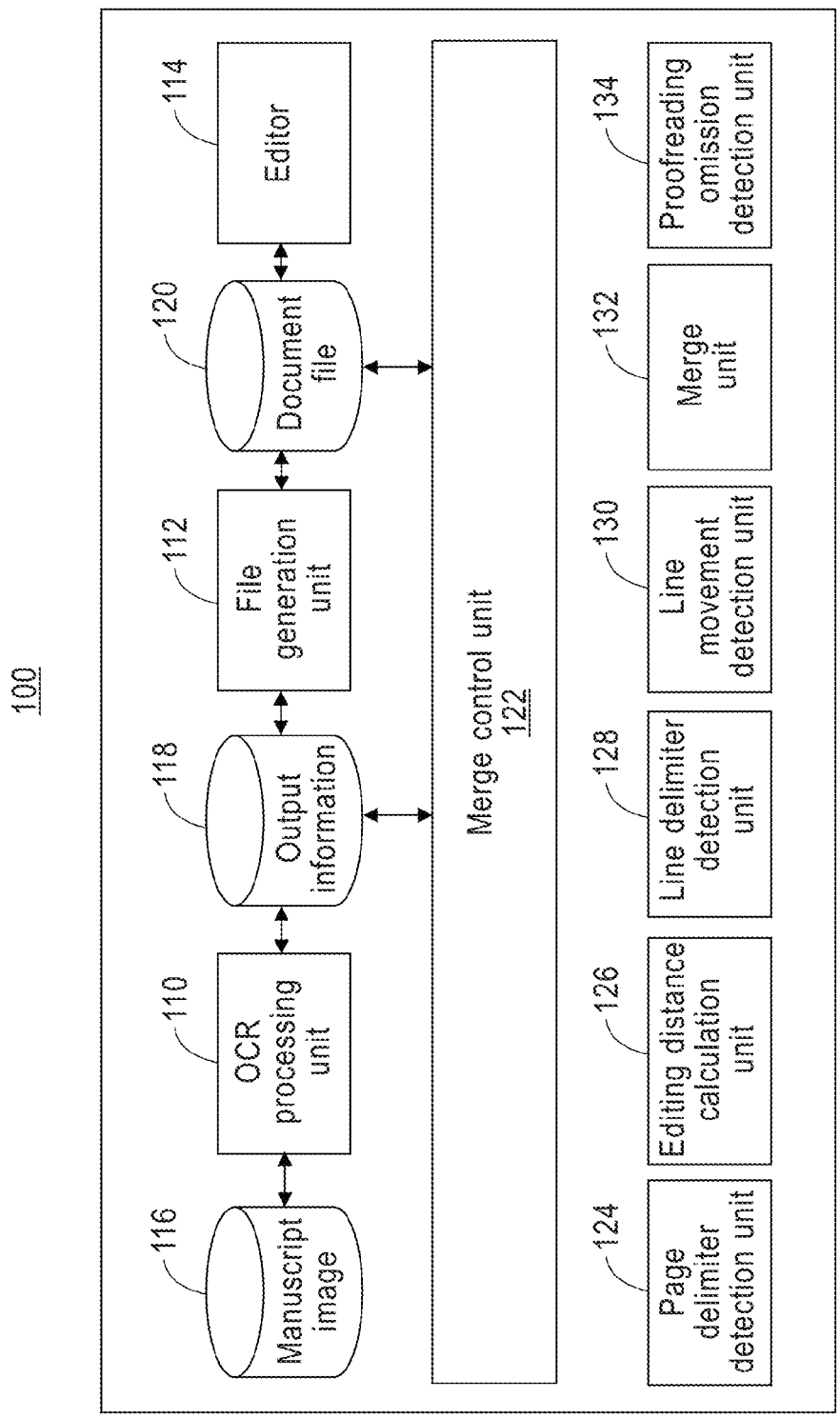
FIG. 1 shows a function configuration of an information processor of the present invention.

As described in Patent Application No. 2009-181225, correction of the source manuscript image is performed using proofreading software that belongs to the OCR software, as in the OCR device. Since this type of proofreading software uses an interface developed uniquely by the vendor, the user's time is required until the user becomes accustomed to the interface used for performance of proofreading of the source manuscript image. Another problem is that operational efficiency is poor since most proofreading software lacks functions for spell checking, grammar checking, and etc.

A method considered for solving this problem is copying the text of the source manuscript image into general-purpose word processing software such as Microsoft Word™ or the like, and then performing a proofread. In this method there is a loss of non-text information in the OCR output data, e.g. recognition candidate characters, positional information of characters and images, or the like. In order to solve this problem, a method has been considered of converting the OCR output data into text, correcting the text using general-purpose word processing software, and then merging the corrected text with the OCR output data. However, the problem is that the position of text changes during correction of the source manuscript image, and when the order of reading of the OCR processing has been adjusted, such adjustment can not be reflected accurately, and therefore the accuracy of correction becomes low.

In order to solve the aforementioned problem, the object of the present invention, even when the position of text is changed by the proofreading operation of the user, is to provide an information processor, method, and program for causing the results of proofreading to accurately reflect the output data of OCR processing, to detect instances of omission of proofreading by the user, and to cause an improvement of proofreading accuracy.

The present invention provides an information processor, method, and program that are capable of: reading out OCR-processed text and generating a document file positioning text according to the order of reading based on output information including the text and position of the text in a source manuscript image obtained by performance of OCR processing. Detecting presence or absence of movement based on proofreading performed on the document file by a user. Furthermore, on condition that line movement has been detected, based on information stipulating position of text and indicating destination of the moved line, moving text that is a constituent element of the line, and reflecting results of the proofreading of the document file in the output information.

According to the present invention, an information processor, method and program are provided so that proofread text having a high proofreading frequency and non-proofread text can be extracted, a characteristic vector of frequently proofread text and a characteristic vector of non-proofread text can be calculated, and non-proofread text having a characteristic vector similar to the characteristic vector of frequently proofread text can be detected as text having the possibility of being text omitted from proofreading.

By adoption of the aforementioned configuration, the present invention is capable of merging OCR output information with results of proofreading. Even when the user proofreading operation results changing the placement positions of text it is capable of detecting omission of proofreading by the user.

Although embodiments of the present invention are explained below, the present invention is not limited by the described embodiments.

FIG. 1 shows a configuration of the information processor of the present invention. The function configuration of the information processor 100 will be explained below in reference to FIG. 1.

The information processor 100 is an information processor for proofreading a document according to the instructions of a user. The information processor 100 executes a program of the aforementioned present invention written in a programming language such as assembler, C, C++, Java™, JavaScript™, PERL, PHP, RUBY, PYTHON, or the like and running under the control of an OS such as a Windows series OS such as Windows™ 7, Windows Vista™, Windows XP™, or the like, or the Mac OS™, Unix™, LINUX™, Google Chrome OS, or the like.

The information processor 100 includes RAM for providing space for execution of the program of the present invention, and a hard disk device (HDD), flash memory, or a similar memory device for sustained retention of the program, data, or the like. By execution of the program, each of the described functions of the present invention are realized using the information processor 100. Each of the function parts of the present embodiment is capable of being implemented by a device-executable program described in the above mentioned programming language or the like.

The information processor 100 includes an OCR processing unit 110, a file generation unit 112, an editor 114, and memory devices 116, 118, and 120.

The OCR processing unit 110 is a function unit for generation of output information by execution of OCR processing of a source manuscript image. That is generated by scanning a printed manuscript that has text printed as character information, i.e. various types of characters, numbers, symbols, or the like. The OCR processing unit 110 acquires the source manuscript image from the memory device 116, recognizes a text region included in this source manuscript image, calculates a text candidate (referred to hereinafter as the "recognition candidate") included in this text region and also calculates the degree of certainty of the text candidate, generates output information, and stores the output information in the memory device 118. The output information includes layout information of the source manuscript image, line layout information of this source manuscript image, text as the constituent elements of the line, recognition candidates, degree of certainties of recognition candidates, or the like.

According to a further embodiment as shown in FIG. 2, ALTO (Analyzed Layout and Text Object), which is one format of XML, is adopted as the format for the output information. In the other embodiments, any markup language format can be used as the format of the output information.

The output information 200 includes layout information 210, layout information 220, text information 222, recognition candidates 230, and degrees of certainty 232.

The layout information 210 includes information for stipulation of page layout of the source manuscript image. The layout information 210 includes page recognition information, pages size, margin, print position, or the like.

The layout information 220 is information for stipulation of layout of the lines included in this source manuscript image. The layout information 220 includes line recognition information, size, or the like of the source manuscript image.

The text information 222 is information indicating the text generated by OCR processing. In the embodiment of the present invention shown in FIG. 2, the character string "Honrei" shown in the text information 222 is a constituent element of a line which layout information 220 indicates. The character string "Honrei" is displayed in a region of the line. In the output information 200, according to the read-out order of the OCR processed text, layout information 220 for stipulation of the line is generated along with text information 222 that is the constituent element of this line. Thus, the placement order of the layout information 220 and the text information 222 stipulates the position of placement of text indicated by the text information 222.

The recognition candidate 230 is text that is presented as a recognition candidate (VS) for text indicated by the text information 222. The degree of certainty 232 is the degree of certainty (VC) of this recognition candidate.

The file generation unit is a function unit for generation of the proofreading target document file. The file generation unit 112 acquires output information from the memory device 118 and generates a document file that is capable of being processed by the editor 114. The document file has page delimiter information for stipulation of page separation as meta data, and the document file is composed of pages in page units that are the same as those of the source manuscript image. According to the read-out order of the text of the source manuscript image by OCR processing, text is arranged for the recognition candidates having the highest degree of certainty.

The editor 114 includes various types of word processing software such as Microsoft Word™, Open Office, or the like for editing the document file generated by the file generation unit 112. The editor 114 displays the document file on a display device (not illustrated) of the information processor 110, and the editor 114 performs deletion, movement, editing, insertion, or the like of the text included in the document file based on instructions of the user, i.e. the proofreader. The editor 114 stores the proofread document file in the memory device 120. The user, i.e. proofreader, does not proofread the page delimiters of the document file.

The merge control unit 122 is a function unit for performing overall control of merge processing such that the contents of the proofing operation performed by the user on the document file are reflected in the output information. The merge control unit 122 accordingly calls the function units described below and executes the merge processing.

The page delimiter detection unit 124 is a function unit for detection of page delimiters of the document file. The page delimiter detection unit 124 uses the page delimiter information of the document file that has undergone proofreading and is stored in the memory device 120 and detects the page delimiters of the document file.

The Levenshtein distance calculation unit 126 is a function unit for calculation of a Levenshtein distance for indication of the degree of similarity of text. The Levenshtein distance calculation unit 126 uses the output information stored in the memory device 118 and the proofread document file stored in the memory device 120 and for character units and line units calculates the Levenshtein distance between text (termed "pre-proofreading text") included in the output information and text (termed "proofread text") included in the proofread document file. For calculation of Levenshtein distance in line units, the Levenshtein distance calculation unit 126 generates information (referred to hereinafter as "line operation information") including information indicating whether or not there was a line operation during in the proofreading operation, information indicating the type of such line operation, information indicating the line number of the pre-proofreading text (i.e. target of this line operation), and information indicating the line number of the proofread text (i.e. target of this line operation). The method of calculation of Levenshtein distance will be described in detail in reference to FIGS. 6 and 8.

The line delimiter detection unit 128 is a function unit for detection of the line delimiters of the proofread document file. The line delimiter detection unit 128 uses the output information stored in the memory device 118 and the proofread document file stored in the memory device 120 to detect the line delimiters of this document file for each page. The method of this detection will be described in detail in reference to FIGS. 5 and 7.

The line movement detection unit 130 is a function unit for detection of movement of a line due to a proofreading operation by the user, based on classification of a line operation performed by the user on the document file as a line deletion operation to erase a line, a line editing operation to revise the text (i.e. constituent elements of the line), or a line insertion operation to insert a line, and then matching of the classified line operations.

Specifically, the line movement detection unit 130 uses the line operation information generated by the Levenshtein distance calculation unit 126, and the line movement detection unit 130 derived from the user's line operations to create a bipartite graph from the set of line deletion operations and the set of line insertion/line editing operations. The line movement detection unit 130 calculates weights indicating the degree of matching between the line deletion operation set constituent elements and the line insertion-line editing operation set constituent elements of this bipartite graph.

The line movement detection unit 130 calculates the maximum weight matching of the bipartite graph and determines as a line movement operation the matching combination. At this time, a line that is the object of the line deletion operation among the highest matching line operations corresponds to a movement source line, and a line that is the object of a line editing or line insertion among such line operations corresponds to a destination line.

The merge unit 132 is a function unit for causing the results of proofreading performed by the user on the document file to be reflected in the output information. Specifically, when the text of the document file has been deleted by a proofreading operation, the merge unit 132 uses the line operation information generated by the Levenshtein distance calculation unit 126, and specifies the text of the output operation corresponding to the deleted text, and deletes such text. If the text of the document file was edited by the proofreading operation (i.e. if there was a replacement of text), then the merge unit 132 uses the line operation information to specify the text of the output information corresponding to such edited text, and performs revision into such edited text. If text of the document file has been moved by the proofreading operation, the merge unit 132 uses the line operation information to specify the text of the output information corresponding to such text, and moves such output information text to the destination. This destination can be specified by a pre-proofreading text line number i and a proofread text line number j, which are parameters of the Levenshtein distance Edit( ) which should be calculated when calculating the line operation weight w, which is described below.

The proofreading omission detection unit 134 is a function unit to detect characters that can possibly be a proofreading omission. The proofreading omission detection unit 134 calculates a characteristic vector of non-proofread characters and a characteristic vector of proofread characters. The proofreading omission detection unit 134, among non-proofread characters, detects as characters having the possibility of being proofreading omission those characters having a characteristic vector close to those of proofread characters. The method of detection of proofreading omission characters will be explained in reference to FIG. 10.

Figure 3:
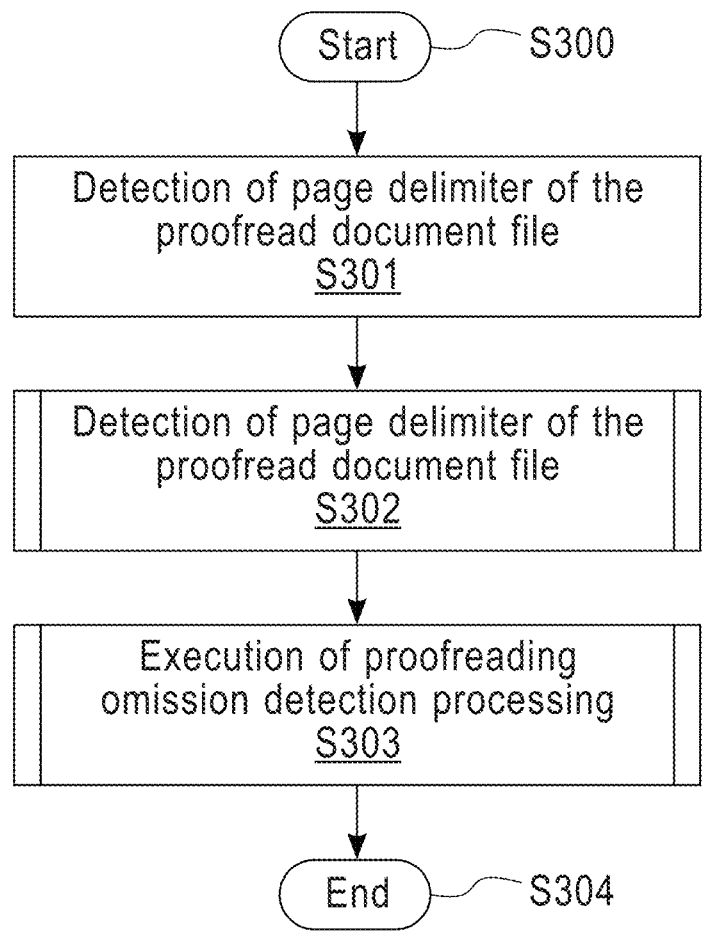
FIG. 3 is a flowchart showing processing executed by the information processor of the present invention.

FIG. 3 is a flowchart showing the process executed by the information processor of the present invention. In reference to FIG. 3, a description will be provided to reflect results of proofreading performed on the document filed by the user.

The process in FIG. 3 begins at step S300. In step S301, the merge control unit 122 calls the page delimiter detection unit 124. The page delimiter detection unit 124 acquires the proofread document file from the memory device 120, and the page delimiter detection unit 124 detects page delimiters of the document file by using the page delimiter information of that document file. In step S302, the merge control unit 122 calls the Levenshtein distance calculation unit 126, line delimiter detection unit 128, line movement detection unit 130, and merge unit 132. The merge control unit 122 merges the text proofread by the user with the output information for each page of the document file. In step S303, the proofreading omission detection unit 134 executes processing (referred to hereinafter as "proofreading omission detection processing") to detect characters having the possibility of being proofreading omission from the document file proofread by the user. The process ends at step S304.

Figure 4:
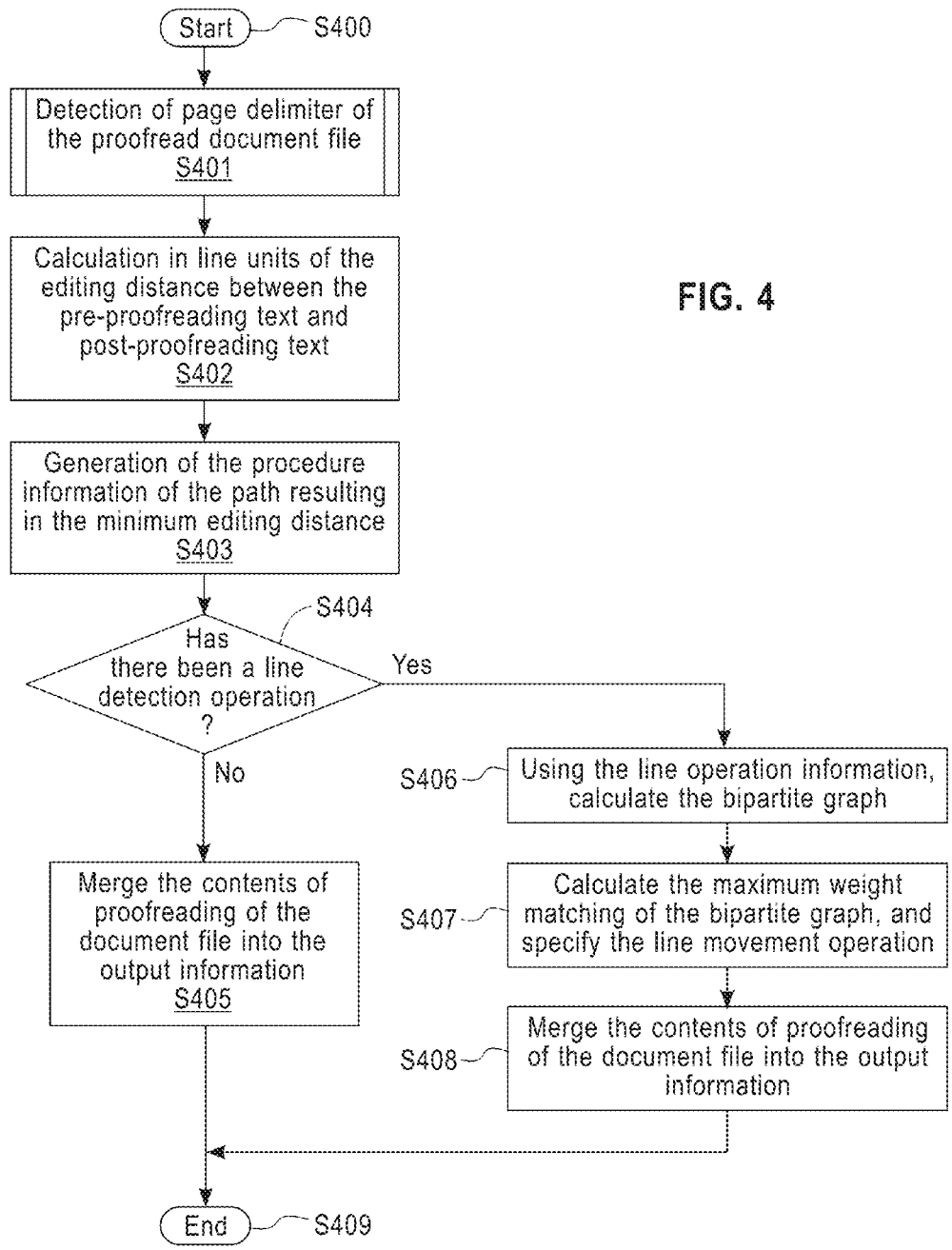
FIG. 4 is a flowchart showing processing of step S302 as shown in FIG. 3.

FIG. 4 is a flowchart showing the process of step S302 as shown in FIG. 3. The process of FIG. 4 starts at step S400. In step S401, the line delimiter detection unit 128 detects a line delimiter from the proofread document file. In step S402, the Levenshtein distance calculation unit 126 calculates the Levenshtein distance between the pre-proofreading text and the proofread text in units of lines formed by the line delimiter obtained in step S401.

In step S403, the Levenshtein distance calculation unit 126 specifies the path that is the solution candidate resulting in the smallest Levenshtein distance calculated in step S402, i.e. specifies the path where text is the most similar, and generates line operation information for that path. In other words, the Levenshtein distance calculation unit 126 generates line operation information for the pre-proofreading text line and the corresponding proofread text line.

In step S404, the merge control unit 122 uses the line operation information generated in step S403 and determines whether or not a line deletion operation has been performed. When a line deletion operation has not been performed (NO), processing diverges to step S405. In step S405, the merge unit 132 merges the results of document file proofreading with the output information stored in the memory device 118, and the process stops at step S409.

Specifically, if the text was edited by the proofreading operation of the user, the merge unit 132 uses the line operation information, specifies text included in the output information corresponding to such edited text, and converts the output information text to edited text. If the text corresponding to part of a line was deleted by the proofreading operation of the user, the merge unit 132 uses the line operation information, specifies text included in the output information corresponding to such text, and performs deletion. If a line has been inserted by the proofreading operation of the user, such a line will be seen as an unexpectedly inserted line, and the merge unit 132 does not merge such text into the output information.

On the other hand, if the determination of step S404 had been that a line deletion operation had been performed (YES), then processing proceeds to step S406. In step S406, the line movement detection unit 130 calculates the bipartite graph using the line operation information generated in step S403. In step S407, the line movement detection unit 130 calculates the maximum weight matches of the bipartite graph and specifies the line movement operations. In step S408, the merge unit 132 merges results of document file proofreading into the output information stored in the memory device 118, and the process stops at step S409.

Specifically, if the text was edited by the proofreading operation, the merge unit 132 uses the line operation information, specifies the text included in output information corresponding to such edited text, and changes such output information text into such edited text.

If the text corresponding to part of a line was deleted by the proofreading operation, the merge unit 132 uses the line operation information, specifies text included in the output information corresponding to such text, and deletes the specified text.

Furthermore, if there has been a line insertion operation, when there exists a line deletion operation corresponding to this insertion operation (i.e. when a line has been moved to a different position by the proofreading operation), the merge unit 132 uses the line operation information, specifies text of this line that was moved and that is included in the output information, and moves such specified text to a position within the output information, i.e. the destination within the output information. If there has been a line insertion operation, and if a line deletion operation corresponding to this insertion operation does not exist, then the line inserted by such an insertion operation is considered to have been inserted unintentionally, and the merge unit 132 does not merge such a line of text into the output information.

Figure 5:
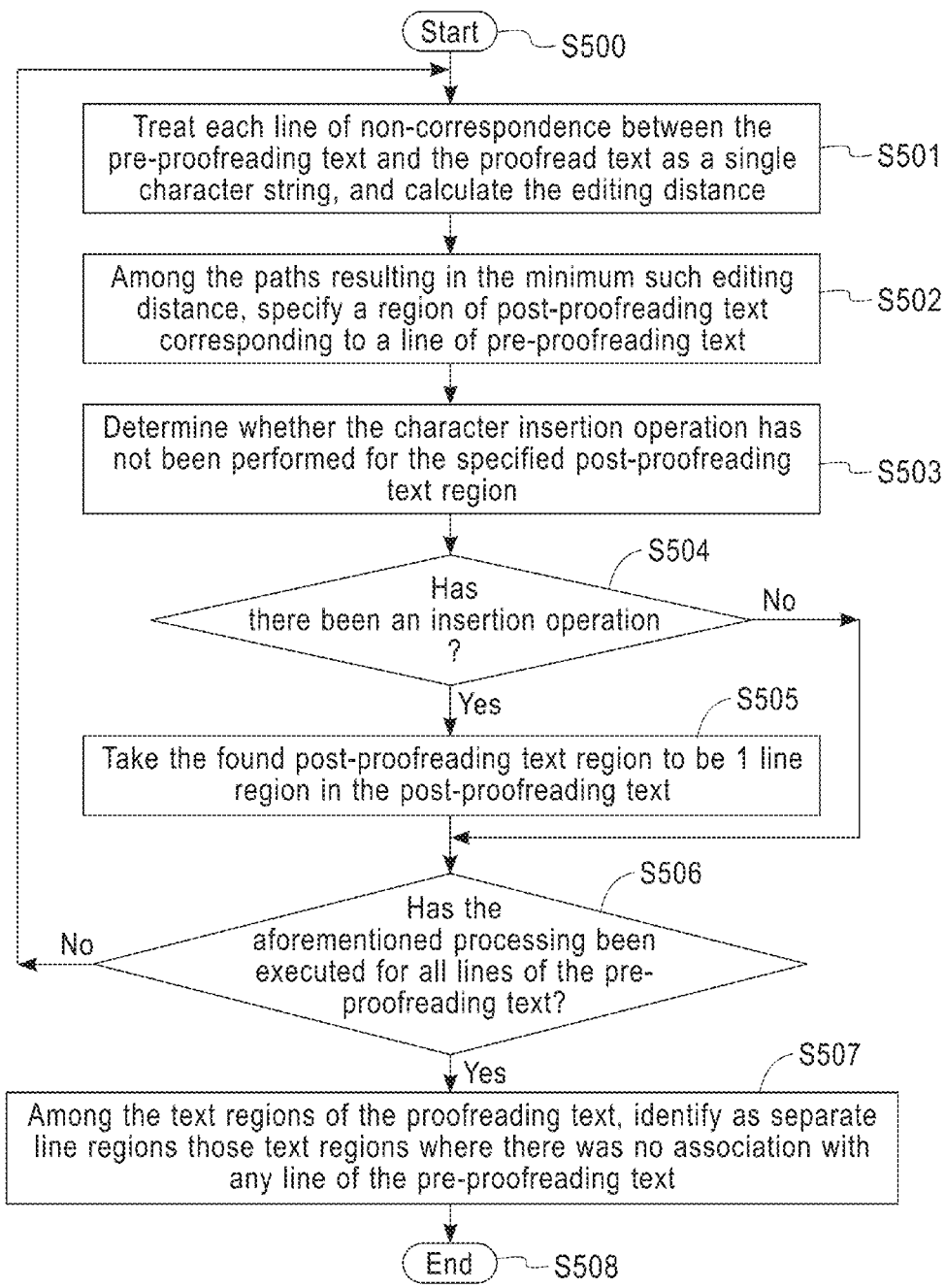
FIG. 5 is a flowchart showing processing of step S401 as shown in FIG. 4.

FIG. 5 is a flowchart showing the processing of step S401 shown in FIG. 4. The processing of FIG. 5 starts with step S500. In step S501, the line delimiter detection unit 128 treats each non-corresponding line region between the non-corresponding lines of the pre-proofreading text and the proofread text as a single character string, and the line delimiter detection unit 128 calculates the Levenshtein distance.

In step S502, the line delimiter detection unit 128 specifies a path forming the minimum Levenshtein distance calculated in step S501, i.e. calculates a single text region corresponding to a line of pre-proofreading text among the regions of proofreading text that are candidate solutions. In step S503, from the degree calculated for the Levenshtein distance according to step S501, the line delimiter detection unit 128 determines whether or not there has been a text insertion operation into the proofread text region specified during step S502. If a text insertion operation had not been performed (YES in step S504), then processing proceeds to step S505. In step S505, the line delimiter detection unit 128 makes a single line region in the proofread text from the found proofread text region.

On the other hand, if there has been no text insertion operation (NO), then processing proceeds to step S505. Thus, a proofread text region is taken to be characters that were unintentionally inputted by the proofreader, and the region of such proofread text is not merged into the pre-proofreading text.

In step S506, the line delimiter detection unit 128 determines whether or not the aforementioned processing has been executed for all lines of the pre-proofreading text. If the aforementioned processing has not been executed for all lines of the pre-proofreading text (NO), then processing returns to step S501, and the aforementioned processing is executed for a different line of the pre-proofreading text. On the other hand, if the aforementioned processing has been executed for all lines of the pre-proofreading text (YES), then processing proceeds to step S507.

In step S507, among the text regions of proofread text, the line delimiter detection unit 128 classifies as a separate line region a text region where the pre-proofing text line is not associated in the aforementioned processing. Processing ends in step S508. If there are multiple non-associated and non-continuous text regions, the line detection unit 128 classifies such test regions as respective separate line regions.

Figure 6:
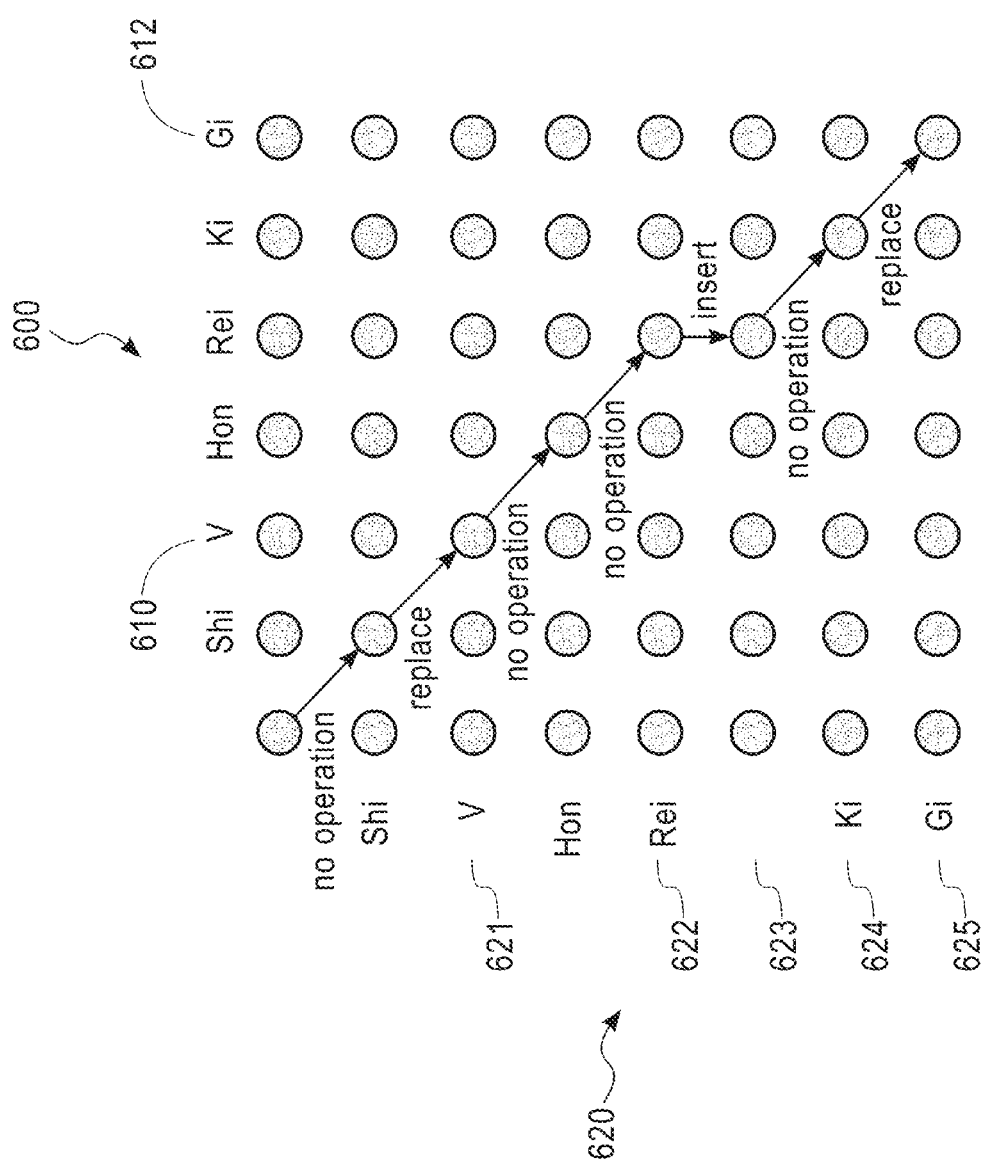
FIG. 6 is a conceptual drawing showing the method of calculation of character-unit Levenshtein distance executed by the information processor of the present invention.

FIG. 6 is a conceptual drawing showing the method of calculating Levenshtein distance in character units executed by the information processor of the present invention. A case will be described below in which the pre-proofreading text "Shi-V-Hon-Rei-Gi" 600 included in the output information generated by the OCR processing unit 110 has been proofread to produce the proofread text "Shi-Ku-Hon-Rei, Ki-Ki" 620.

Referring to FIG. 6, the proofreading operation of the user replaces "V" 610 with "Ku" 621, and replaces "Gi" 612 with "Ki" 625. Comma punctuation is added between "Rei" 622 and "Ki" 624. In order to calculate Levenshtein distance, the present invention assigns values for the text editing operations. For example, if it is assumed that text deletion, insertion, and replacement are each assigned "1" as a cost, the total cost due to this proofreading operation becomes a Levenshtein distance of "3."

In this embodiment, cost is assigned by calculation of cost using the degree of certainty of text cited as a recognition candidate by OCR treatment. This cost can be derived by Numerical Formula 1.

$$\text{cost}=(100-(\text{degree of certainty}))/100 \quad \text{Numeric Formula 1}$$

For example, the recognition candidates of the second character "V" 610 of the pre-proofreading text 600 are "V," "Ku," "(," "<" (two-byte character), "<" (single-byte character), "Gu," and "No," and the respective degrees of certainty are "81," "80," "72," "72," "72," "46," and "26." In this case, the editing cost when "V" 610 is proofread as "Ku" is found by substituting the degree of certainty of "Ku" (i.e. "80") into the above listed numerical formula to obtain "0.2" (=(100−80)/100).

In a further embodiment of the present invention as shown in FIG. 6, OCR processing is performed on a manuscript written in Japanese, and the Levenshtein distances are calculated for the pre-proofreading text and proofread text. The present invention is also capable of calculation of Levenshtein distance for any other language.

Figure 7:
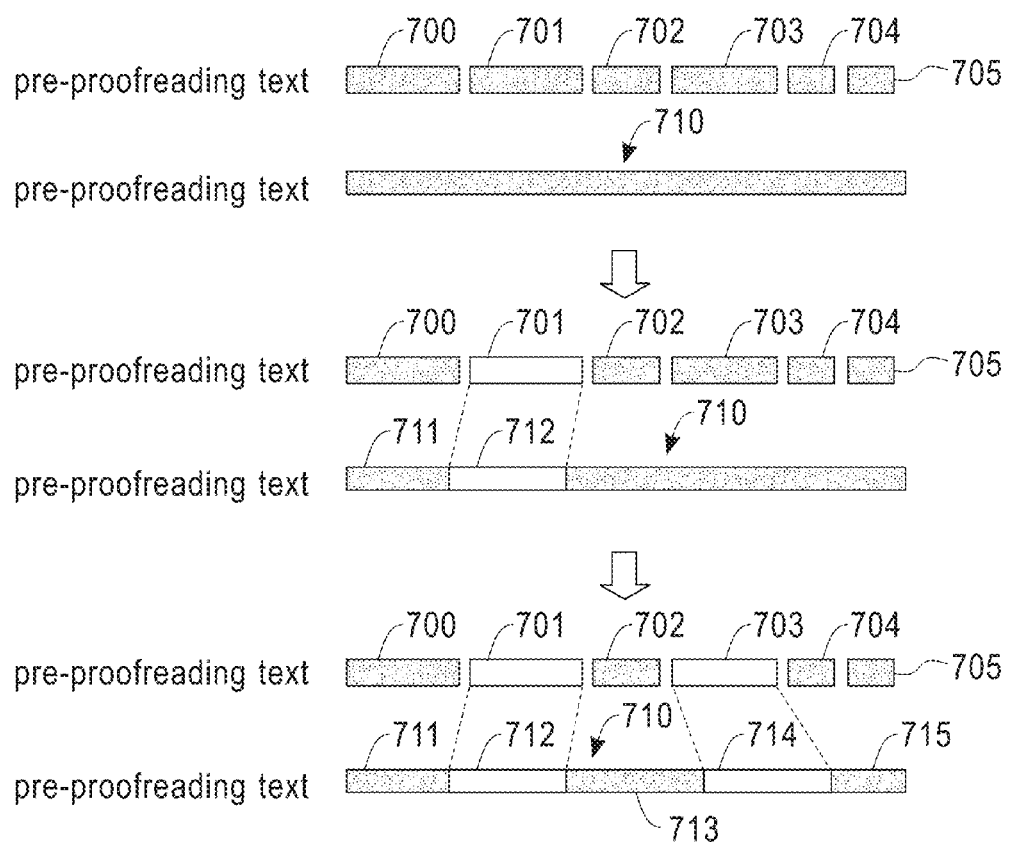
FIG. 7 is a conceptual drawing showing the method of detection of line delimiters executed by the information processor of the present invention.

FIG. 7 is a conceptual drawing showing the method for detection of line delimiter that is executed by the information processor of the present invention. The method of line delimiter detection executed by the line delimiter detection unit 128 of the information processor 100 will be explained below.

In the line delimiter detection method, Levenshtein distances are calculated between line 700 of the pre-proofreading text and all text 710 included in a single page of the proofread text. Then the text region of proofread text having the minimum Levenshtein distance is specified, i.e. the text region is specified that has text that is most similar to the text included in line 700 of the pre-proofreading text. Referring to FIG. 7, a text region of proofread text corresponding to line 700 of the pre-proofreading text is taken to not exist.

Next, the Levenshtein distances are calculated between line 701 of the pre-proofreading text and all text 710 included in a single page of proofread text, and the text region of proofread text having the resultant minimum Levenshtein distance is specified. Referring to FIG. 7, text region 712 of the proofread text is taken to correspond to line 701 of the pre-proofreading text.

In the same manner, Levenshtein distances are calculated between all text 710 included in a single page of proofread text and each of the other lines 702, 703, 704, and 705 of pre-proofreading text, and the text region of proofread text resulting in the minimum Levenshtein distance is specified.

In this method for detection of line delimiter, the specified text regions 712 and 714 are equivalent to a single line region of the proofread text. The non-specified text regions 711, 713, and 715 are equivalent to other line regions. It is possible to detect line delimiters of the proofread text.

Figure 8:
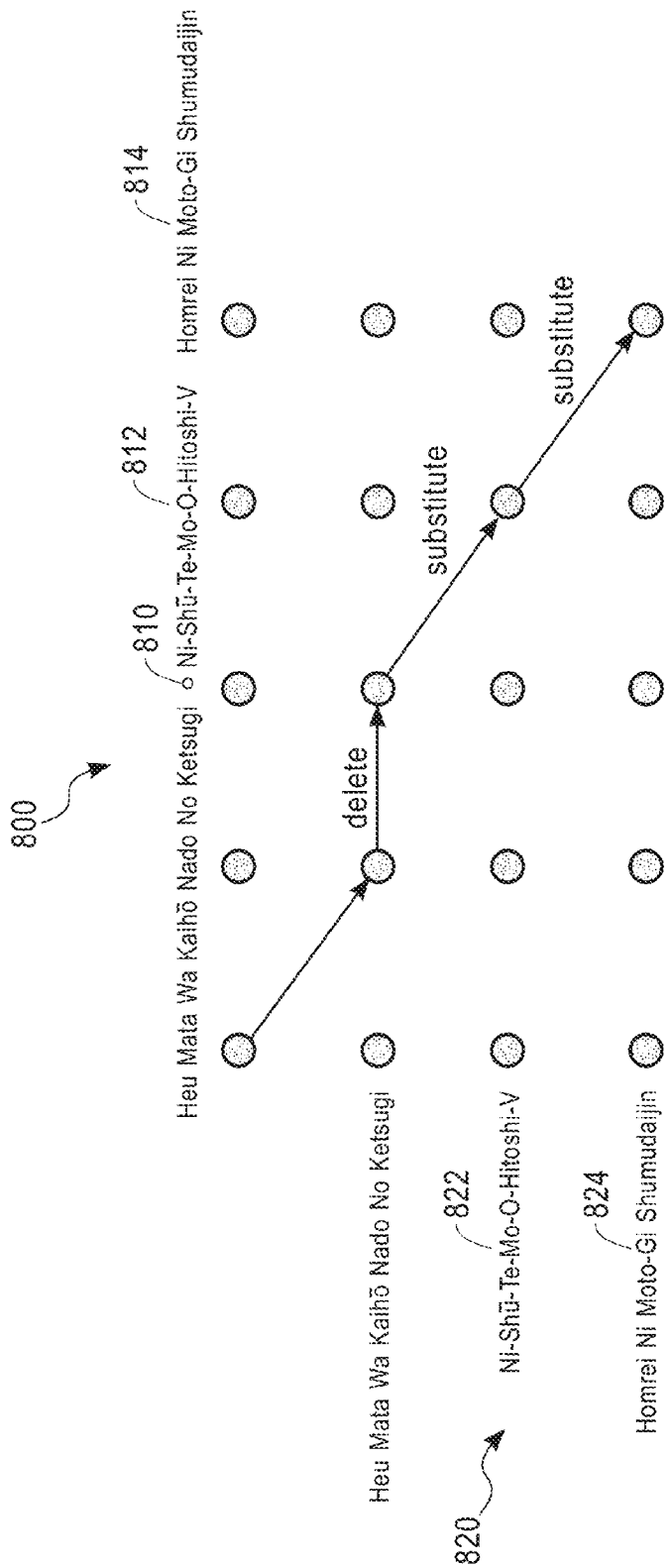
FIG. 8 is a conceptual drawing showing the method of calculation of line-unit Levenshtein distance executed by the information processor of the present invention.

FIG. 8 is a conceptual drawing showing the method of calculation of Levenshtein distance of line units executed by the information processor of the present invention. This calculation method allocates costs for text editing operations in the same manner as the calculation method of Levenshtein distance of character units explained in reference to FIG. 6, and page by page, this calculation method calculates Levenshtein distance between each line of proofread text 820 and each line of pre-proofread text 800.

In a further embodiment of the present invention as shown in FIG. 8, since the entire line 810 composed of the character "O" was deleted by the user's proofreading operation, line operation information is generated that indicates that this line 810 deletion operation was performed. Since the line 812 composed of the character string "Ni-Shū-Te-Mo-O-Hitoshi-V" is replaced by the line 822 composed of the character string "Ni-Shū-Te-Mo, Hitoshiku", line operation information is generated indicating that an editing procedure has been performed on this line 822. In the same manner, since the line 824 composed of the character string "Honrei Ni Motozuki Shumudaijin" has replaced line 814 composed of the character string "Honrei Ni Motozu-Gi Shumudaijin," line operation information is generated that indicates that an editing operation has been performed on this line 824.

In the embodiment of the present invention shown in FIG. 8, OCR processing of the manuscript was performed, and the Levenshtein distances were calculated for the pre-proofreading text and the proofread text Thus it is possible for the present invention to calculate Levenshtein distance for any language.

Figure 9:
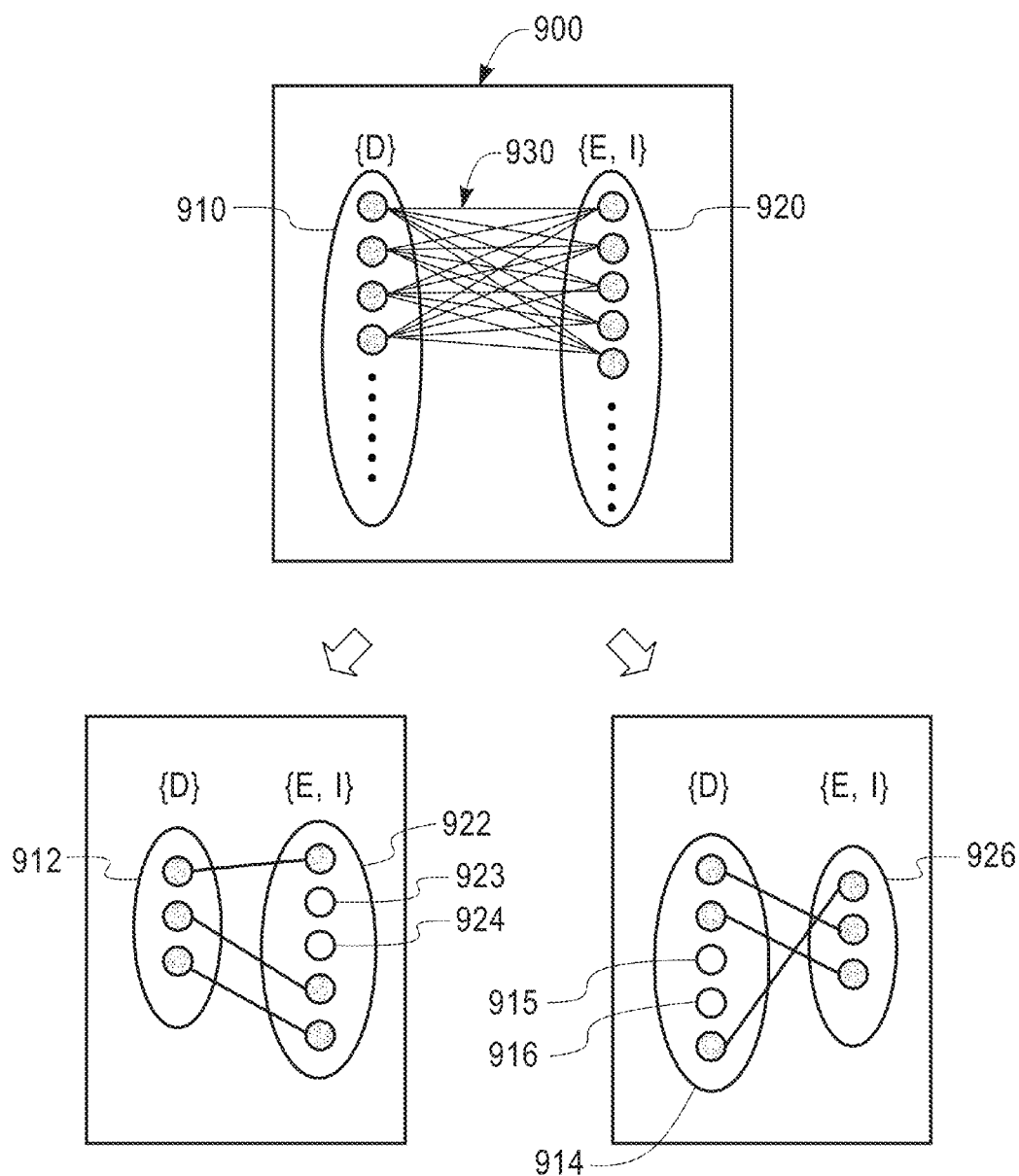
FIG. 9 is a conceptual drawing showing the method of detection of a line movement operation executed by the information processor of the present invention.

FIG. 9 is a conceptual drawing showing the method of detection of a line movement operation performed by the information processor of the present invention. The method of detection of the line movement operation indicated by the processing of steps S406 to S408 shown in FIG. 4 is explained below in reference to FIG. 9.

In the line movement operation detection method, the line movement detection unit 130, using the line operation information, first generates a bipartite graph by classifying the line operations by the user proofreading operations as belonging to one of two categories, i.e. a line deletion operation set {D} 910 and a line editing and line insertion operation set {E,I} 920. Specifically, the line movement detection unit 130 uses the below listed Numerical Formulae 2 to calculate weights w(M,M') of the graph line segments 930 between the operations M' included in the line editing and line insertion operation set {E,I} 920 and the operations M included in the line deletion operation set {D} 910, and to generate the bipartite graph.

$$w(M,M')=1/\text{Dist}(M,M') \quad \text{Numerical Formulae 2}$$

When i and j both are greater than or equal to 1:

$$\text{Dist}(M,M')=\text{Edit}(L(i),L'(j))+\epsilon\,\text{Edit}(L(i-1),L'(j-1))$$

Otherwise:

$$\mathrm{Dist}(M,M')=\mathrm{Edit}(L(i),L'(j))$$

Where, i indicates the line number of the pre-proofreading text subjected to a line deletion operation M, and j indicates the line number of the proofread text subjected to a line editing operation or line insertion operation M'. L(i) indicates the line of pre-proofreading text subjected to a line deletion operation M, and L(j) indicates the line of proofread text subjected to a line editing operation or line insertion operation M'. Edit(L(i),L'(j)) indicates the Levenshtein distance between the pre-proofreading text line L(i) subjected to a line deletion operation M and the proofread text line L(j) subjected to a line editing operation or line insertion operation M'.

Dist(M,M') indicates the degree of weighting of matching between the line deletion operation M and the line editing operation or line insertion operation M'. When there exist multiple lines where the values of Edit(L(i),L'(j)) are similar, c is a constant for giving priority to the combination of lines having similar line text and being located immediately prior to the lines indicated by L(i) and L(j), and a positive number having a value less than or equal to 1 is used as E. In another embodiment, layout information included in the output information can be used for calculation of Dist(M,M').

Next, the line movement detection unit 130 uses the weights w(M,M') calculated using the aforementioned Numerical Formula 2, specifies the combination of line deletion operation $M_{max}$ and line editing operation or line insertion operation $M'_{max}$ resulting in the highest weight, and specifies the line editing operation or line insertion operation $M'_{max}$ that matches the line deletion operation $M_{max}$. At this time, the line subject to the line deletion operation $M_{max}$ matched with the line editing operation or line insertion operation $M'_{max}$ corresponds to a movement source line, and the line subject to this line editing operation or line insertion operation $M_{max}$ corresponds to a destination line.

Thereafter the merge unit 132 reflects the results of proofreading in the pre-proofreading text. If there exist line editing operations M' 923 and 924 of set {E,I} 922 that do not match any of the line deletion operations M of set {D} 912, then such line editing operations are considered to be proofreading of characters of part of a line subjected to this line editing operation M', and the merge unit 132 reflects the proofreading result in the pre-proofreading text.

If there exits line insertion operations M' 923 and 924 of the set {E,I} 922 that do not match with any of the line deletion operations M of the set {D} 912, the lines that are the subject of these line insertion operation M' are considered to be lines that were unintentionally inserted during proofreading, and such a line insertion operation is not reflected in the pre-proofreading text.

When there exist set {D} 914 line deletion operations M 915 and 916 that do not match any of the line editing operations or line insertion operations M' of the set {E,I} 926, the lines that are subject to such line deletion operations M are considered to be lines that were deleted by the user during proofreading, and the merge unit 132 deletes such lines from the pre-proofreading text.

In a case in which i and j are both greater than or equal to 1 in the aforementioned Numerical Formula 2 (i.e. in a case in which the weight w(M,M') is calculated for a line deletion operation M and a line editing operation or line insertion operation M' for a second and greater line, the weight w(M, M') is calculated by taking into account Levenshtein distance between the line L(i−1) of the line immediately prior to the line where the line deletion operation M was performed and the line immediately prior to the line where the line editing operation or line insertion operation M' was performed. Thus, when the Levenshtein distance of the immediately prior lines is small (i.e. when the character strings of the immediately prior lines are similar), the value of the weight w(M,M') becomes large. On the other hand, if the Levenshtein distance between the immediately prior lines is large (i.e. when the character strings of the immediately prior lines are not similar), the value of the weight w(M,M') becomes small.

Normally, the order of reading out of OCR processing is often correct within block units (i.e. within paragraphs or the like). The information processor 100 of the present invention uses weights w(M,M') of line operations calculated while taking into account the Levenshtein distances of the immediately prior lines in the aforementioned manner, and determines matching of the line operations. Thus, even if there exist multiple similar instances of text within the same page, the lines are assumed to be matching when the prior lines are determined to best match one another. By this means the order of read out in block units by OCR processing is prioritized, it is possible to merge the proofread text into the output information, and it is possible to improve precision of merger.

Referring to FIG. 9, the information processor 100 considers the Levenshtein distance of the immediately prior lines in the aforementioned manner and performs matching of the line operations using the calculated line operation weights w(M,M'). However, in a further embodiment, it is permissible to consider the Levenshtein distances of the immediately following lines and to perform matching of line operations using the calculated line operation weights w(M,M').

Figure 10:
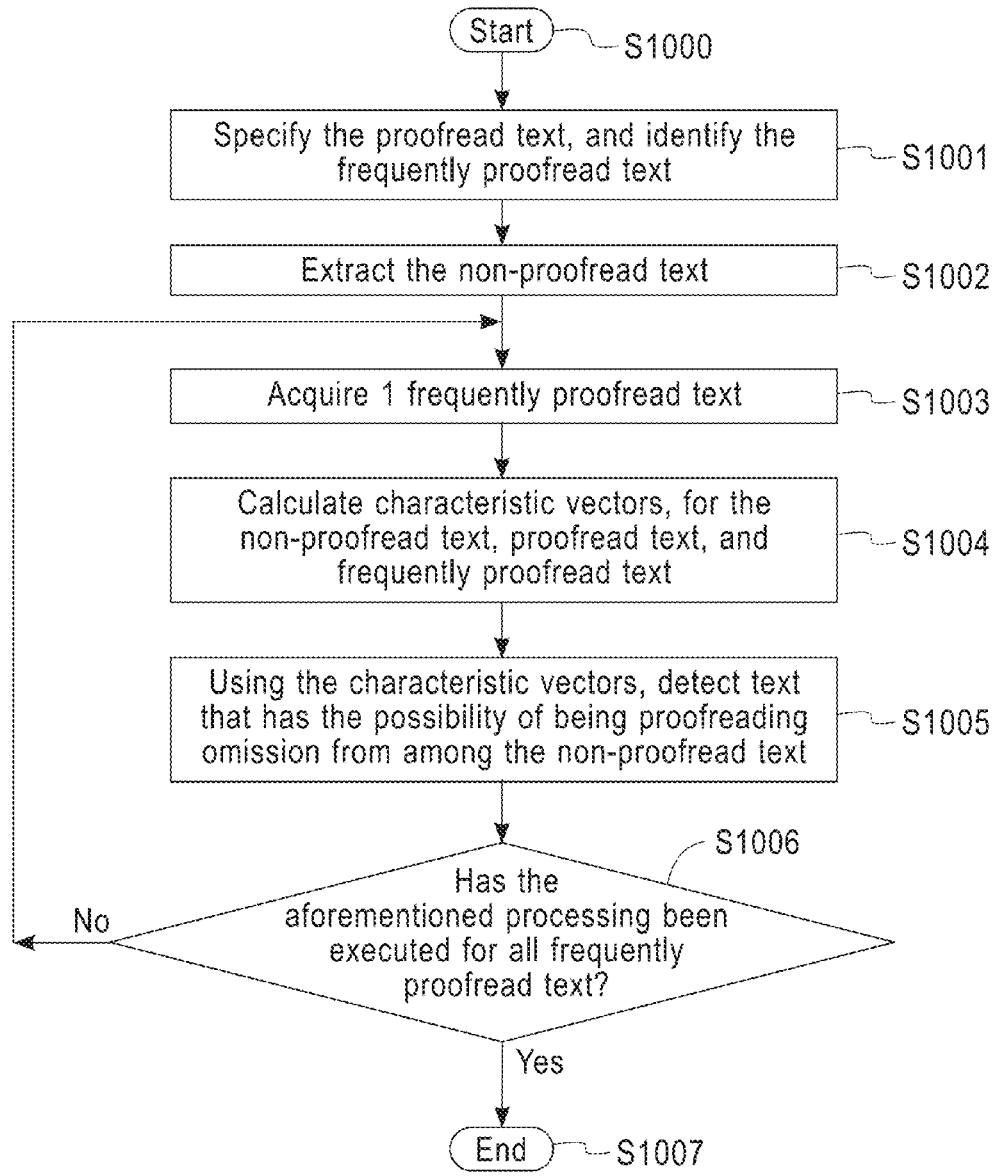
FIG. 10 is a flowchart showing processing to detect proofreading omission of step S303 shown in FIG. 3.

FIG. 10 is a flowchart showing the proofreading omission detection processing of step S303 as shown in FIG. 3. The processing of FIG. 10 begins at step S1000. In step S1001, the proofreading omission detection unit 134 specifies text that has been proofread by the user proofreading operation, and among the proofread text, classifies as high frequency proofread text the text that has a high frequency of proofreading.

Specifically, the proofreading omission detection unit 134 uses the line operation information, and from the proofread text, extracts text of lines that have been the subject of line editing operations. The proofreading omission detection unit 134 uses the output information, acquires text of lines of the proofreading text corresponding to text of the lines subjected to the line editing operation, and causes the Levenshtein distance calculation unit 126 to calculate the Levenshtein distances of such text. The proofreading omission detection unit 134 detects text where this Levenshtein distance is large, i.e. text that has been proofread by the proofreading operation. The proofreading omission detection unit 134 counts the number of detections of such proofread text and identifies text where this frequency is greater than or equal to a certain threshold value as high frequency proofread text.

In step S1002, the proofreading omission detection unit 134 extracts non-proofread text, i.e. text that has not been proofread by the proofreading operation. Specifically, the proofreading omission detection unit 134 extracts from the proofread text the text of lines that have a small Levenshtein distance from text of lines that were subject to a line editing operation and from text of lines having a small Levenshtein distance from text of lines of pre-proofing text corresponding to such lines that were subject to a line editing operation. The proofreading omission detection unit 134 also uses the line operation information to extract non-proofread text by extraction of text that had not been the subject to a line editing operation from among the proofread text.

In step S1003, the proofreading omission detection unit 134 acquires 1 high frequency proofread text from the high frequency proofread text identified in step S1001. In step S1004, the proofreading omission detection unit 134 uses the degree of certainty and the recognition candidates included in the output information to calculate characteristic vectors of proofread text acquired in step S1001, characteristic vectors of all non-proofread text extracted in step S1002, and characteristic vectors of high frequency proofread text acquired in step S1003.

For example, among the text recognized as the character "To" by OCR processing, when the recognition candidates of the non-proofread text and the high frequency proofread text proofread by the user are "Ah," "Ka," "2," "Ko," "Sa,", "To," and "C," characteristic vectors of such text become 7-dimensional. For example, if the degrees of certainty of the recognition candidates of such high frequency proofread text are 80 for "Ah," 60 for "To," and 40 for "C," then the 7-dimensional vector becomes (80, 0, 0, 0, 0, 60, 40). In the same manner, it is possible to calculate the characteristic vector of the non-proofread text. In this embodiment of the present invention, a method can be used that calculates approximately the nearest characteristic vector and that calculates high-dimensional characteristics vectors as described in Mayur Datar, Nicole Immorlica, Piotr Indyk, and Vahab S. Mirrokni (2004), Locality-sensitive hashing scheme based on p-stable distributions, Proceedings of the twentieth annual symposium on Computational geometry, (SCG '04). ACM, New York, N.Y., USA, 253-262.

In step S1005, the proofreading omission detection unit 134 uses the characteristic vectors calculated in step S1004, and from among the non-proofread text, detects text that has the possibility of being proofreading omission. Specifically, the proofreading omission detection unit 134 compares the high frequency proofread text characteristic vector and the characteristic vectors of the non-proofread text and proofread text, and the proofreading omission detection unit 134 selects a number (i.e. k texts, where k is an odd integer) of non-proofread texts and proofread texts that have characteristic vectors approximating the characteristic vector of high frequency proofread text. Then the proofreading omission detection unit 134, when there are more proofread texts than non-proofread texts among the selected texts, detects such non-proofread text as text possibly being a proofreading omission.

In step S1006, the proofreading omission detection unit 134 determines whether or not the processing indicated from step S1003 to step S1005 has been executed for all the high frequency proofread text that was identified in step S1001. If such processing has not been executed for all the high frequency proofread text (NO), then processing returns to step S1003, and such processing is executed for all the high frequency proofread text. On the other hand, if such processing has been executed for all the high frequency proofread text (YES), processing proceeds to step S1007 and ends.

Figure 11:
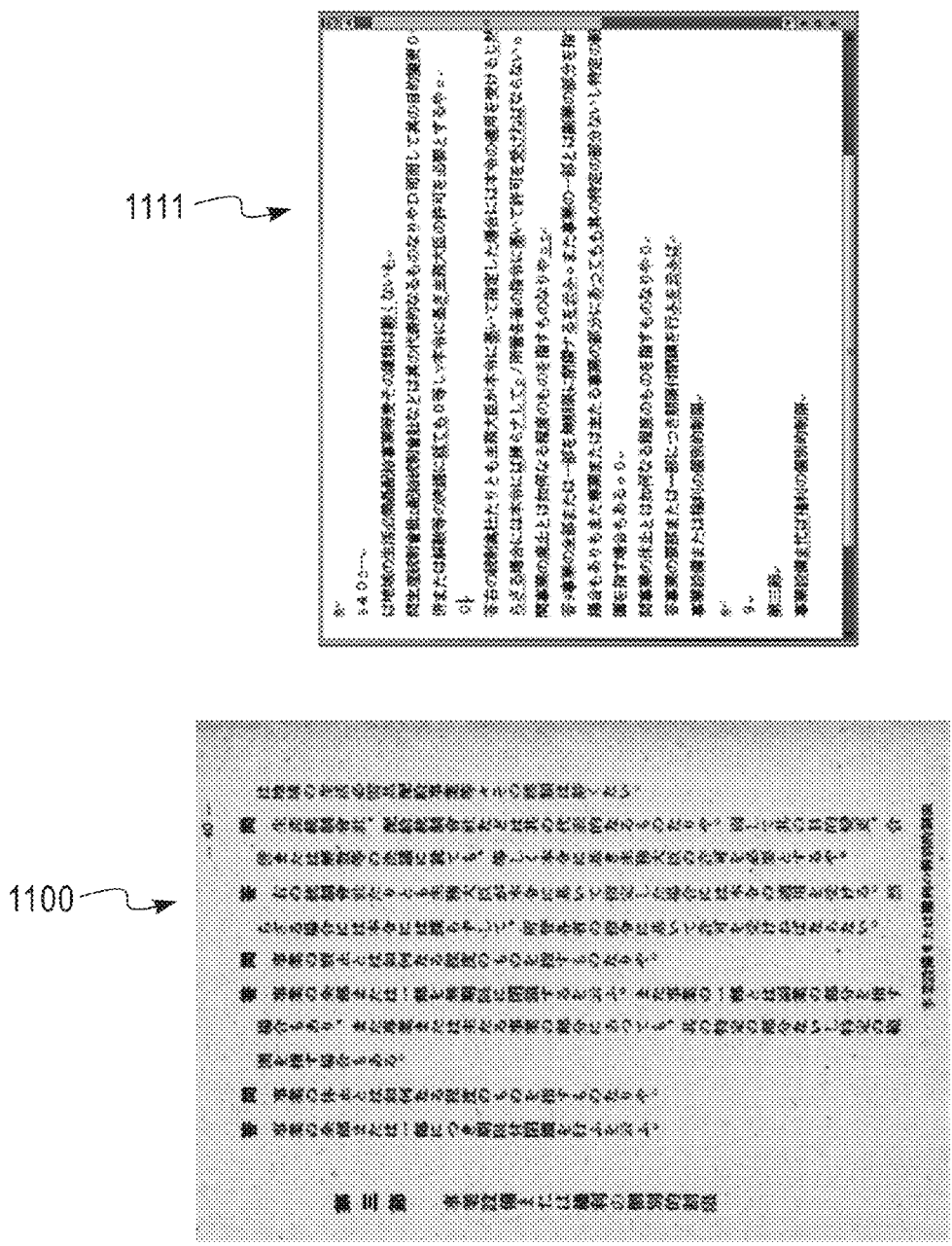
FIG. 11 shows working images of document proofreading using the invention of the present application.

FIG. 11 shows operational images of document proofreading using the application of the present invention. The source manuscript image 1100 is a source manuscript image of a manuscript to undergo digitalization. The UI (User Interface) 1111 is a UI of the editor for proofreading of text generated by performance of OCR processing of this source manuscript image. The editor can be any word processing software. Therefore, the user can perform the proofreading operation using an editor that the user is accustomed to, and it is possible to increase efficiency of proofreading operation. It is possible to greatly increase operational efficiency by the use of the spell check and grammar check functions possessed by this editor.

Figure 12:
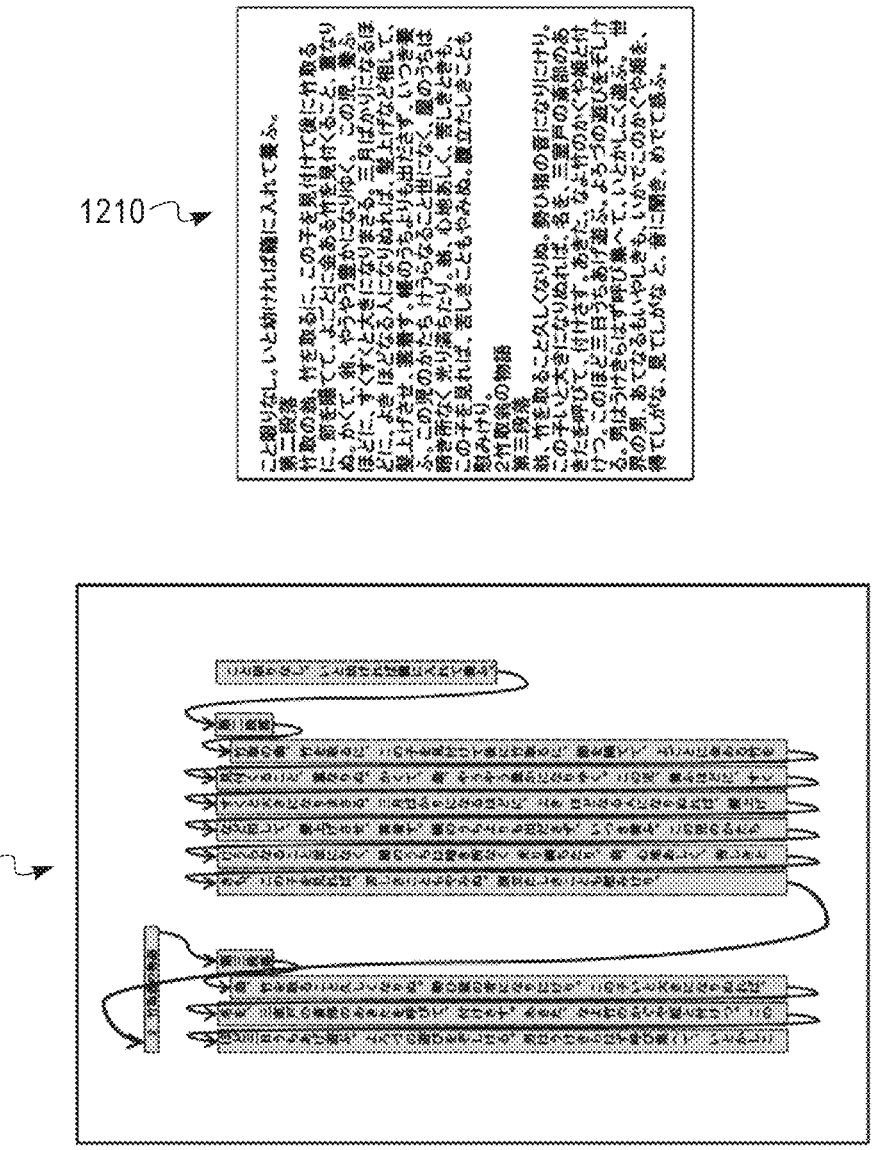
FIG. 12 shows embodiments of a manuscript to be digitized and a document generated by OCR processing of such a manuscript.

FIG. 12 shows one embodiment of a manuscript to be digitized and a document file generated by OCR processing of this manuscript.

Manuscript 1200 is the manuscript to be digitized. Within manuscript 1200, the arrows indicate the order of read out of OCR processing. The document file 1210 is a pre-proofreading document file generated from the output information obtained by OCR processing of the manuscript 1200. The document file 1210 is composed of text in the read-out order of OCR processing indicated by these arrows.

Figure 13:
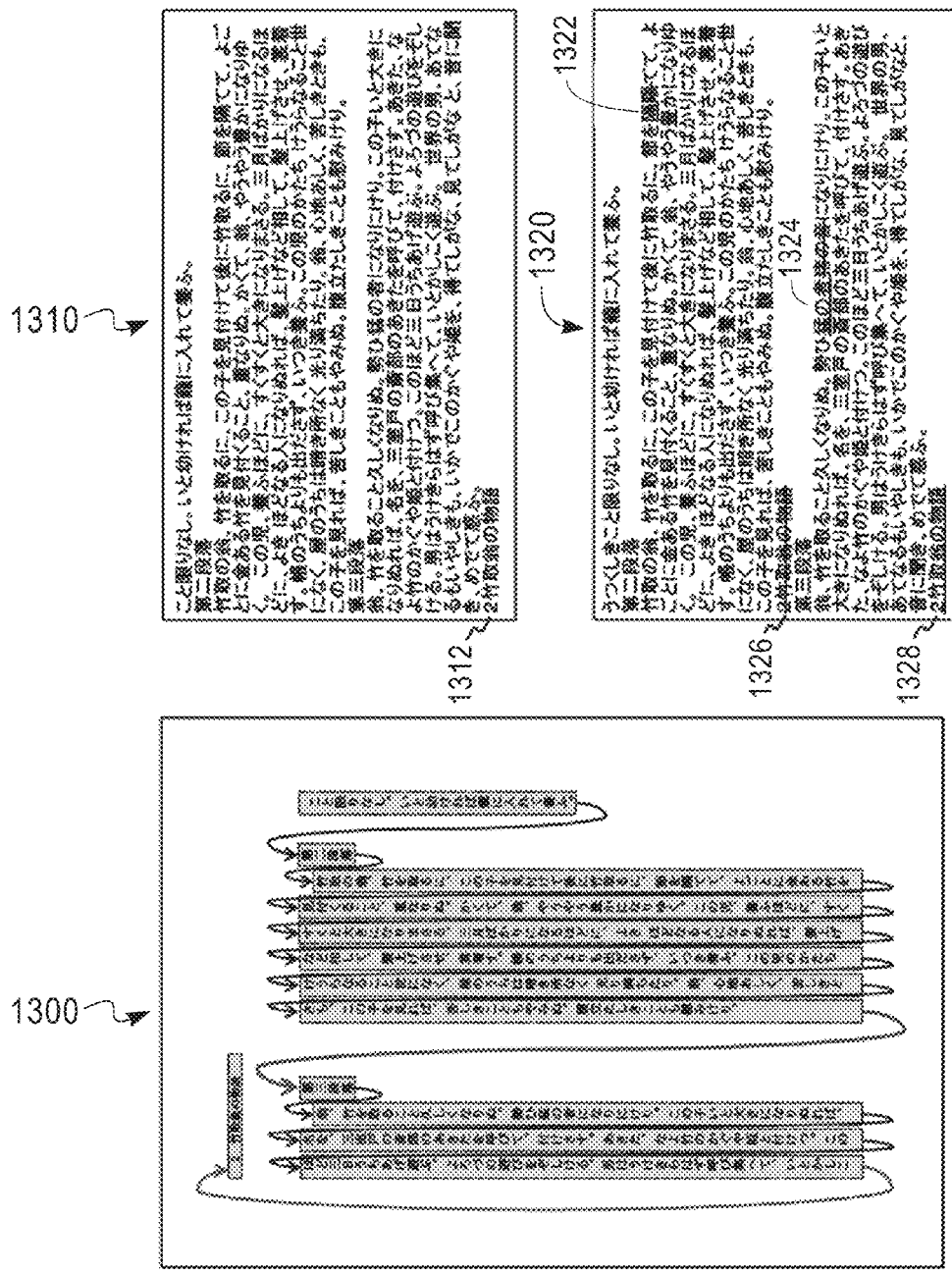
FIG. 13 is an image showing the document file after proofreading of the document file as shown in FIG. 12 and the before-versus-after differences between these files.

FIG. 13 is an image showing the document file after proofreading of the document file 1210 shown in FIG. 12 and the differences between these files.

Manuscript 1300 is a manuscript for undergoing digitization that is identical to the manuscript 1200 as shown in FIG. 12. The document file 1310 is a file that was generated by the user proofreading the document file 1210. The placement of the text changes in line units due to the user proofreading of the document file 1210, and the order of read-out of the OCR processing is changed from the order indicated by the arrows of the manuscript 1200 shown in FIG. 12 to the order indicated by the arrows of manuscript 1300.

The difference 1320 is the difference between the pre-proofreading document file 1210 and the post-proofreading document file 1310. In this embodiment, the character "Yo" 1322 is changed by editing to the character "Heda," and the character string "Inoshishi No Oto" is changed by editing to the character string "Take No Mono" 1324. The merge unit 132 changes this character "Yo" included in the output information pre-proofreading text to the character "Heda," and changes this character string "Inoshishi No Oto" to the character string "Take No Mono."

Due to the proofreading operation, the line 1326 formed from the character string "2 Taketori No Okina" is deleted, and the line 1328 formed from this character string is inserted. Due to correspondence between this deletion operation and this insertion operation, the merge unit 132 inserts this character string in the position of the output information pre-proofreading text corresponding to the insertion position 1312 of the post-proofreading document file 1310.

Figure 14:
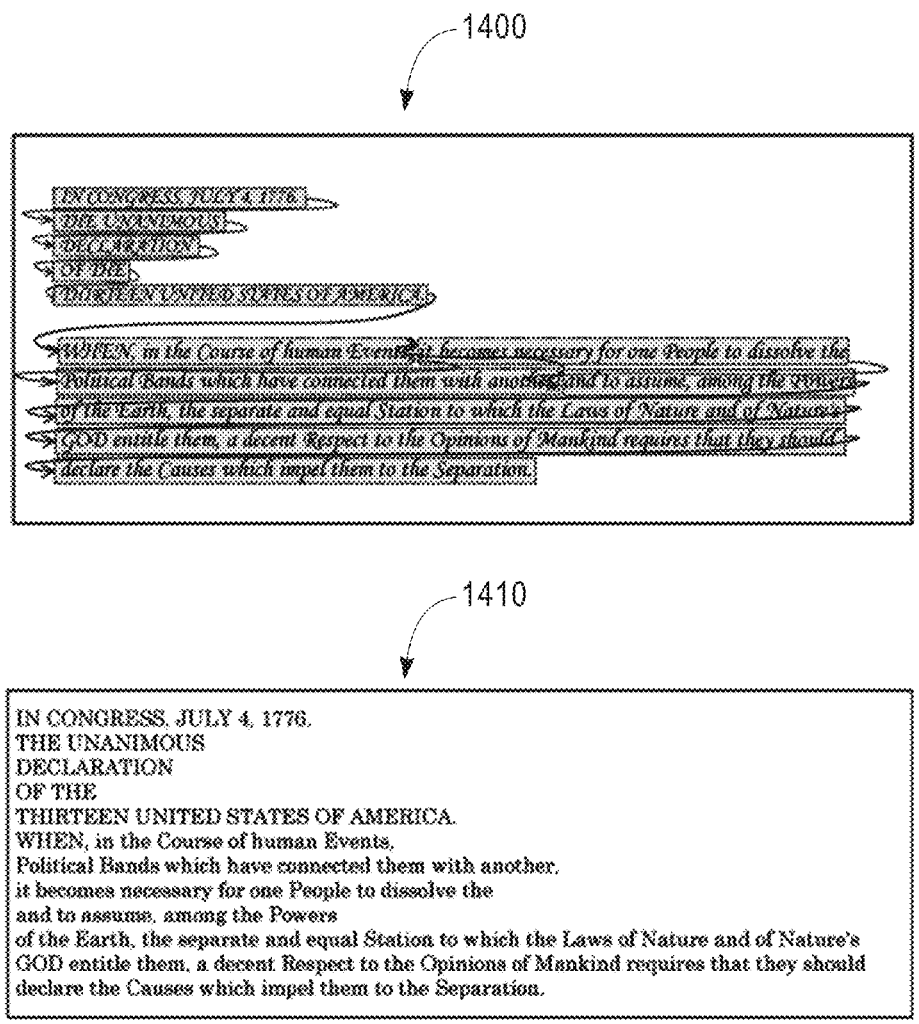
FIG. 14 shows a separate embodiment of a manuscript for digitization and a document generated by OCR processing of such a manuscript.

FIG. 14 is an image of a further embodiment of a manuscript to be digitized and a document generated by OCR processing of this manuscript.

The manuscript 1400 is the manuscript to be digitized. The order of read-out of OCR processing in manuscript 1400 is indicated by the arrow symbols. Document file 1410 is the pre-proofreading document file generated from the output information obtained by OCR processing of the manuscript 1400. Document file 1410 is composed of text in the read-out order of OCR processing indicated by these arrow symbols.

Figure 15:
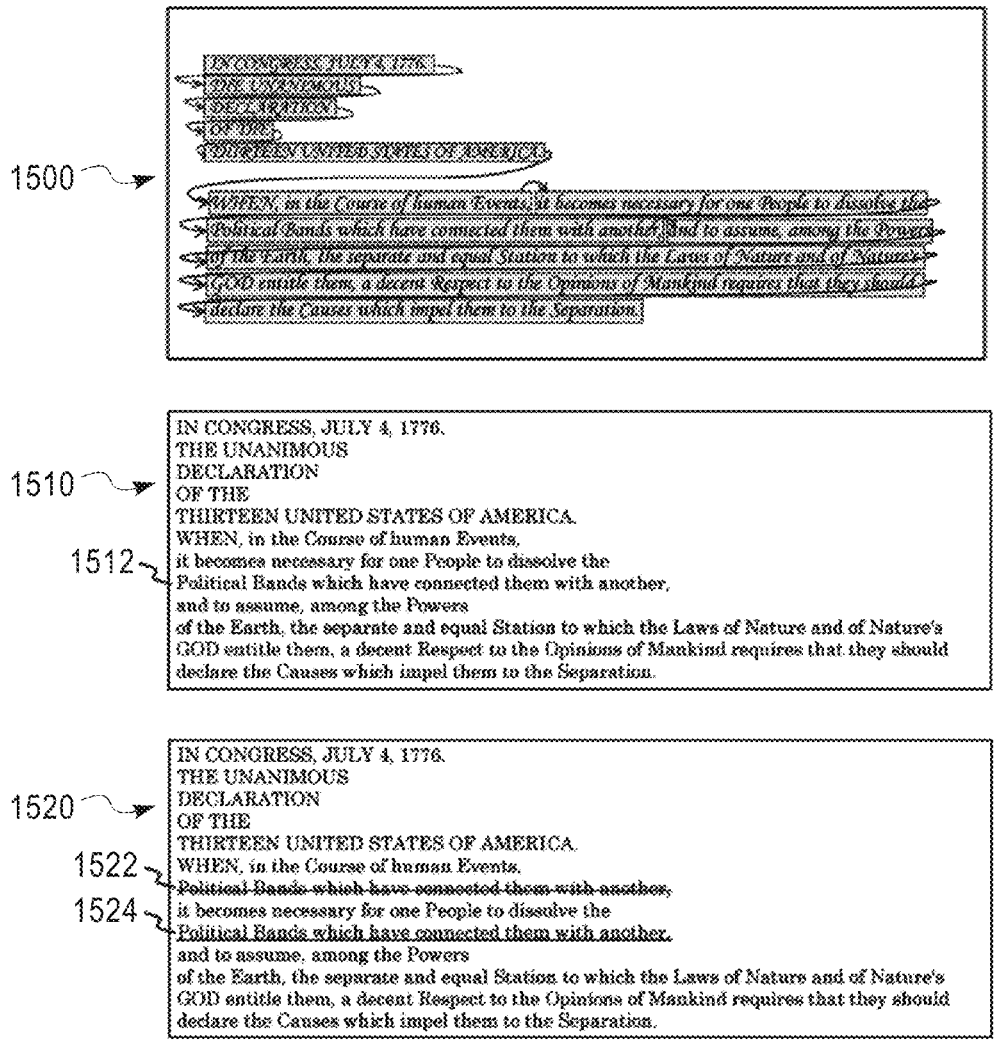
FIG. 15 is an image showing the document file after proofreading of the document file as shown in FIG. 14 and the before-versus-after differences between these files.

FIG. 15 shows images of the document file 1410 shown in FIG. 14, the proofread document file, and the difference between these files.

Manuscript 1500 is a manuscript to be digitized that is the same as the manuscript 1400 as shown in FIG. 14. The document file 1510 is a file generated by the user proofreading the document file 1410. In the document file 1410, the placement of text has been revised in line units by the proofreading operation of the user. The order of read-out of OCR processing has been changed from the order indicated by the arrow symbols of manuscript 1400 shown in FIG. 14 to the order shown by the arrow symbols of manuscript 1500.

The difference 1520 is the difference between the pre-proofreading document file 1410 and the post-proofreading document file 1510. Referring to FIG. 15, the line 1522 composed of the character string "Political Bands which have connected them with another" is deleted by the proofreading operation of the user, and the line 1524 composed of this character string is inserted. Since this deletion operation and this insertion operation correspond to one another, the merge unit 132 inserts this character string in the position of output information pre-proofreading text corresponding to the insertion position 1512 of the post-proofreading document file 1510.

Figure 16:
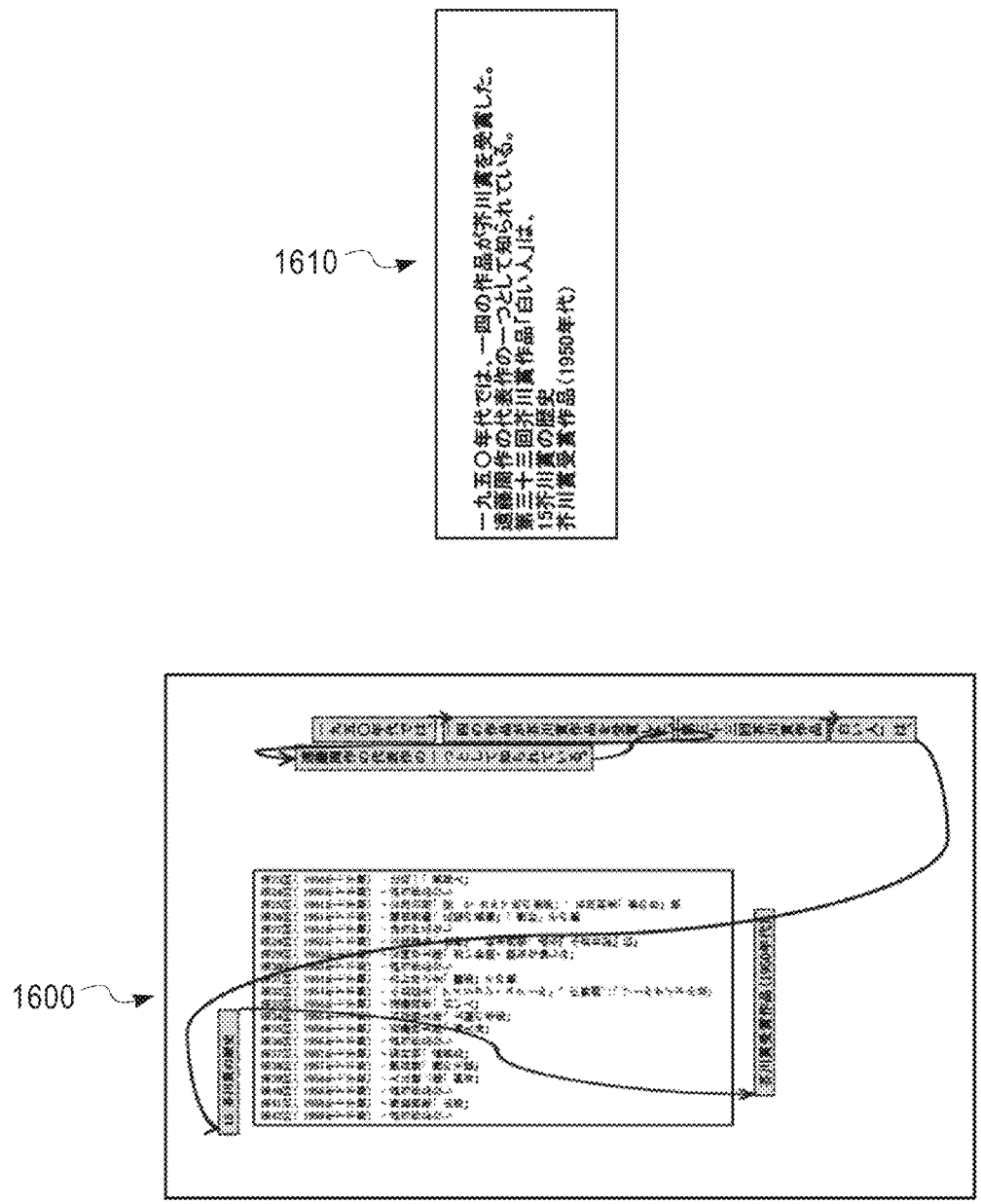
FIG. 16 shows another embodiment of a manuscript for digitization and a document generated by OCR processing of such a manuscript.

FIG. 16 is an image of a further embodiment of a manuscript to be digitized and a document generated by OCR processing of this manuscript.

The manuscript 1600 is the manuscript to be digitized. The order of read-out of OCR processing in manuscript 1600 is indicated by the arrow symbols. Document file 1610 is the pre-proofreading document file generated from the output information obtained by OCR processing of the manuscript 1600. Document file 1610 is composed of text in the read-out order of OCR processing indicated by these arrow symbols.

Figure 17:
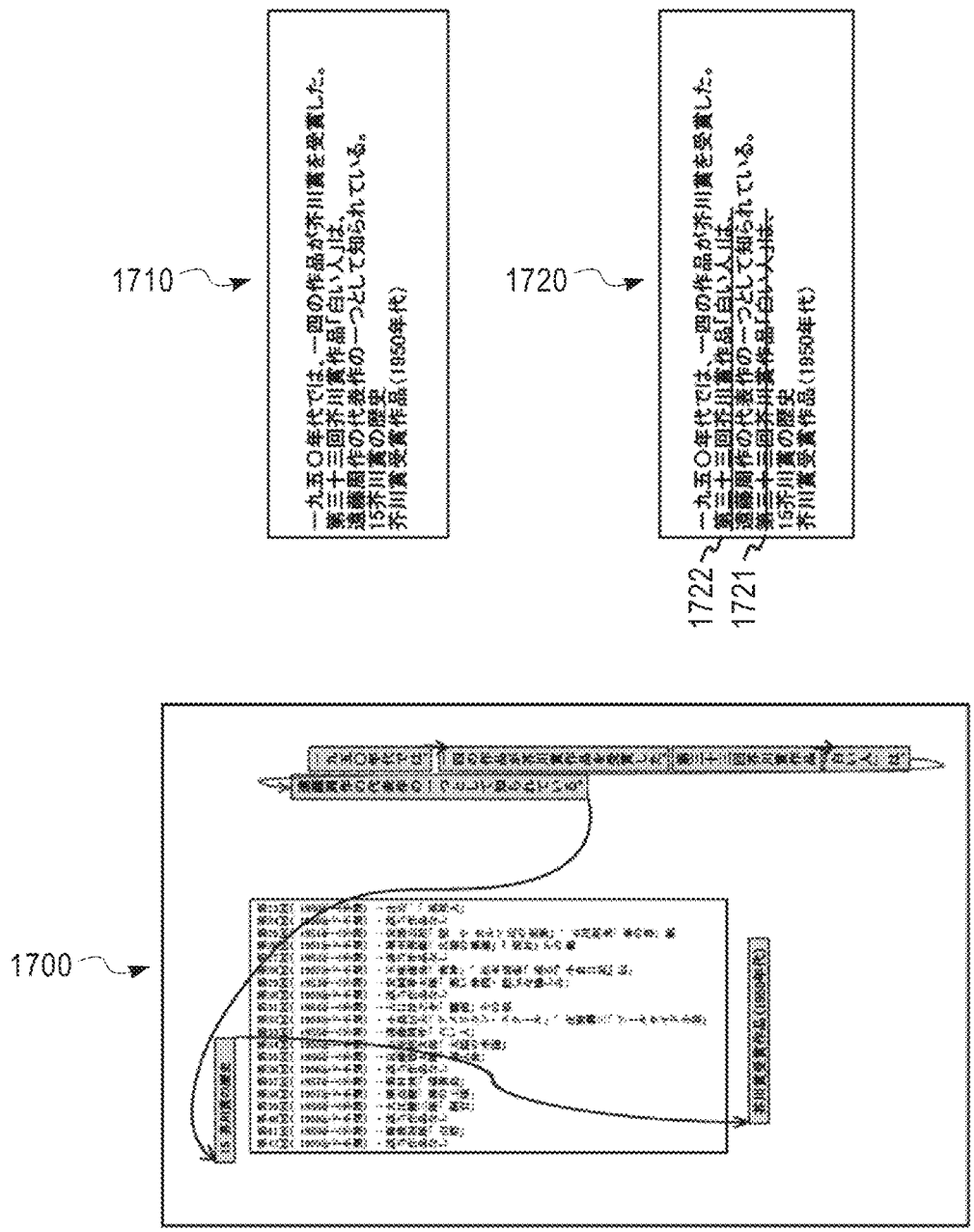
FIG. 17 is an image showing the document file after proofreading of the document file as shown in FIG. 16 and the before-versus-after differences between these files.

FIG. 17 shows images of the document file 1610 as shown in FIG. 16, the proofread document file, and the difference between these files.

Manuscript 1700 is a manuscript to be digitized that is the same as the manuscript 1600 as shown in FIG. 16. The document file 1610 is a file generated by the user proofreading the document file 1610. In the document file 1710, the placement of text has been revised in line units by the proofreading operation of the user. The order of read-out of OCR processing has been changed from the order indicated by the arrow symbols of manuscript 1600 shown in FIG. 16 to the order shown by the arrow symbols of manuscript 1700.

The difference 1720 is the difference between the pre-proofreading document file 1610 and the post-proofreading document file 1710. In this embodiment, the line 1721 composed of the character string "Daisanjūsan-kai Akutagawa Sh ū Sakuhin 'Shiroi Hito'" is deleted by the proofreading operation of the user, and the line 1722 composed of this character string is inserted. Since this deletion operation and this insertion operation correspond to one another, the merge unit 132 inserts this character string in the position of output information pre-proofreading text corresponding to the insertion position 1712 of the post-proofreading document file 1710.

Figure 18:
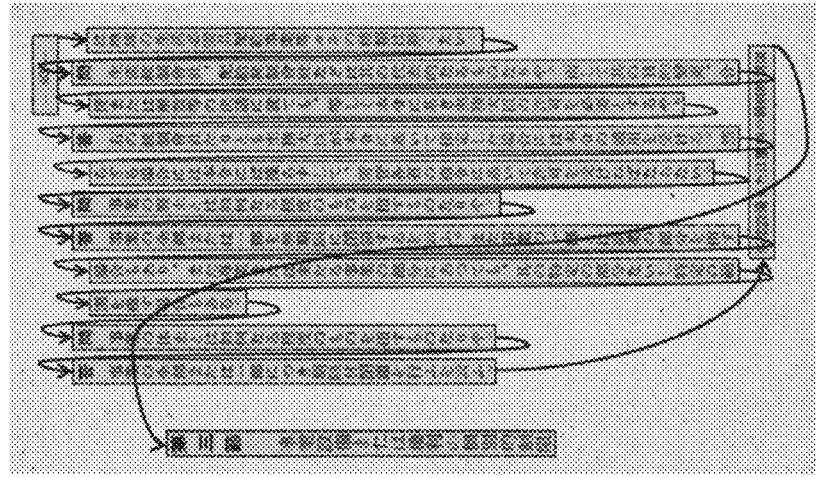
FIG. 18 shows another embodiment of a manuscript for digitization and a document generated by OCR processing of such a manuscript.

FIG. 18 is an image of a further embodiment of a manuscript to be digitized and a document generated by OCR processing of this manuscript.

Referring to FIG. 18 the manuscript 1800 is the manuscript to be digitized. The order of read-out of OCR processing in manuscript 1800 is indicated by the arrow symbols. Text 1810 is the pre-proofreading document file generated from the output information obtained by OCR processing of the manuscript 1800. Document file 1810 is composed of text in the read-out order of OCR processing indicated by these arrow symbols.

Figure 19:
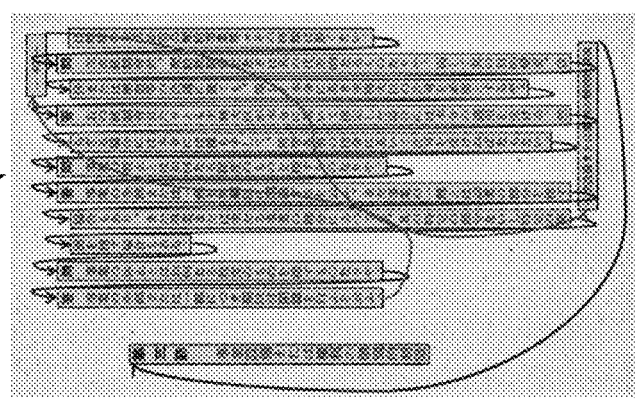
FIG. 19 is an image showing the document file after proofreading of the document file as shown in FIG. 18 and the before-versus-after differences between these files.

FIG. 19 shows images of the document file 1810 as shown in FIG. 18, the proofread document file, and the difference between these files.

Referring to FIG. 19, the manuscript 1900 is the manuscript to be digitized and is identical to the manuscript 1800 shown in FIG. 18. The document file 1910 is a file generated by the user proofreading the document file 1810. Text position has been changed in line units by the proofreading operation performed by the user on the document file 1810, and the read-out order of OCR processing has changed from the order indicated by the arrow symbols of the manuscript 1800 shown in FIG. 18 to the order shown by the arrow symbols of the manuscript 1900.

The difference shown in 1920 is the difference between the pre-proofreading document file 1810 and the post-proofreading document file 1910. In this embodiment, the characters or character strings 1921 to 1930 are deleted by the proofreading operation of the user. Since there is no insertion operation corresponding to this deletion operation, the merge unit 132 deletes these characters or character strings from the pre-proofreading text.

Due to the proofreading operation by the user, line 1931 composed of the character string "94O0-" was deleted, and a line 1932 is inserted that is composed of this character string after editing as the character string "-40-". Since this deletion operation and this insertion operation correspond to one another, the merge unit 132 inserts this character string into the position of the output information pre-proofreading text corresponding to the insertion position 1912 of the post-proofreading document file 1910.

Due to the proofreading operation of the user, other characters indicated by strikethrough lining have been edited to become the corresponding characters indicated by underlining. The merge unit 132 changes such characters included in the pre-proofreading text.

The present invention can be used for digitization of various types of manuscripts. The present invention is particularly useful for large scale digitization projects requiring proofreading of a huge number of documents, such as the digitization project of the Japanese National Diet Library, the EU digitization project, the Australian newspapers digitization program, or the like.

Although embodiments were described heretofore, the present invention is not limited to the aforementioned embodiments. Modifications are possible within a scope capable of being conceived by one skilled in the art, and such modifications are exemplified by changes and deletions of functional means of such embodiments, addition of other functional means, or the like. As long as the operation and effect of the present invention are realized, all such modified embodiments are included in the scope of the present invention.

What is claimed is:

1. An information processor for proofreading a document, the information processor comprising:
   a first storage unit for storing output information which includes information text and positional information obtained by performing Optical Character Recognition (OCR) on a source manuscript image;
   a second storage unit for storing a document file that is proofread by a user, wherein the document file is generated by reading the OCR-processed text according to the order of reading the output information;
   a line movement detection unit for detecting movement of a line which includes text in the document file based on the proofreading performed by the user on the document file; and
   a merge unit for reflecting results of the proofreading of the document file in the output information;
   wherein the line movement detection unit calculates a weight indicating a degree of matching between a line deletion operation for deletion of the line which includes text in the document file and a line insertion operation or a line editing operation;
   wherein the line movement detection unit detects movement of the line by determining whether the line deletion operation and the line insertion operation or a line editing operation results in a maximum weight; and
   wherein the merge unit displaces text that is a constituent element of the line and included in the output information, if the line movement detection unit has detected movement of the line according to the information stipulating a destination of the line obtained by calculating the weight.

2. The information processor according to claim 1, wherein the line movement detection unit calculates the weight using:

a Levenshtein distance indicating a degree of similarity between text being a constituent element of the line in the document file subject for the line insertion operation or the line editing operation, and text being a constituent element of a line in the output information subject for the line deletion operation; and a Levenshtein distance indicating a degree of similarity between text being a constituent element of a line adjacent to the line in the output information, and text being a constituent element of line adjacent to the line in the document file.

3. The information processor according to claim 1, wherein a proofreading omission detection unit is used for:

extracting a high frequency proofread text having a high frequency of proofreading;

extracting a non-proofread text;

calculating a characteristic vector of the high frequency proofread text;

calculating a characteristic vector of the non-proofread text;

and detecting, the non-proofread text having a characteristic vector similar to the characteristic vector of the high frequency proofread text, as text having a possibility of being omitted from proofreading.

4. The information processor according to claim 1, wherein a line delimiter detection unit for detection of a line delimiter of the document file proofread by the user; and wherein the line movement detection unit detects line movement in line units according to the line delimiter.

5. A method for proofreading a document comprising:

generating a document file positioning text according to the order of reading of Optical Character Recognition (OCR) processed text, based on output information which includes text obtained by an OCR processing of a source manuscript image and information of position of the text in the source manuscript image;

detecting movement of a line which includes text in the document file produced by proofreading by a user; and reflecting results of proofreading of the document file in the output information;

wherein the process of detecting movement comprises:

calculating a weight indicating degree of matching between a line deletion operation of deleting the line which includes text in the document file and a line insertion operation or a line editing operation;

determining the line as being moved if the line deletion operation and line insertion operation or line editing operation have the maximum weight; and wherein, if movement of the line is detected, the reflection process includes moving text constituting the line in the output information according to information of designation of the line obtained by calculating the weight.

6. The method according to claim 5, wherein calculating the weight comprises using:

a Levenshtein distance indicating a degree of similarity between text being a constituent element of a line in the document file subject for the line insertion operation or the line editing operation, and text being a constituent element of a line in the output information subject for the line deletion operation; and a Levenshtein distance indicating a degree of similarity between text being a constituent element of a line adjacent to the line in the output information, and text being a constituent element of line adjacent to the line in the document file.

7. The method according to claim 5, wherein an information processor:

extracts a high frequency proofread text having a high frequency of proofreading and a non-proofread text;

calculates a characteristic vector of the high frequency proofread text and a characteristic vector of the non-proofread text; and detects the non-proofread text having a characteristic vector similar to the characteristic vector of the high frequency proofread text as text having a possibility of being omitted from proofreading.

8. The method according to claim 5, further comprising:

detecting a line delimiter of the document file proofread by the user; and detecting line movement in line units according to the line delimiter.

9. A computer readable non-transitory article of manufacturing tangibly embodying computer readable instructions which, when executed, cause a computer to carry out the steps of a method, comprising:

generating a document file positioning text according to the order of reading of Optical Character Recognition (OCR) processed text, based on output information which includes text obtained by an OCR processing of a source manuscript image and information of position of the text in the source manuscript image;

detecting movement of a line which includes text in the document file produced by proofreading by a user; and reflecting results of proofreading of the document file in the output information;

wherein the process of detecting movement comprises:

calculating a weight indicating degree of matching between a line deletion operation of deleting the line which includes text in the document file and a line insertion operation or a line editing operation;

determining the line as being moved if the line deletion operation and line insertion operation or line editing operation have the maximum weight; and wherein, if movement of the line is detected, the reflection process includes moving text constituting the line in the output information according to information of designation of the line obtained by calculating the weight.

* * * * *